US012613710B2

(12) United States Patent
Ben-Elazar et al.

(10) Patent No.: US 12,613,710 B2
(45) Date of Patent: *Apr. 28, 2026

(54) AUTOMATED GENERATION OF EARLY WARNING PREDICTIVE INSIGHTS ABOUT USERS

(71) Applicant: Microsoft Technology Licensing, LLC, Redmond, WA (US)

(72) Inventors: Shay Ben-Elazar, Herzliya (IL); Daniel Sitton, Tel Aviv (IL); Yossef Ben David, Tel Aviv (IL); Amnon Catav, Tel Aviv (IL); Meitar Ronen, Tel Aviv (IL); Ori Bar-Ilan, Even Yehuda (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 178 days.

This patent is subject to a terminal disclaimer.

(21) Appl. No.: 18/500,256

(22) Filed: Nov. 2, 2023

(65) Prior Publication Data

US 2024/0061688 A1 Feb. 22, 2024

Related U.S. Application Data

(63) Continuation of application No. 17/306,847, filed on May 3, 2021, now Pat. No. 11,842,204.

(Continued)

(51) Int. Cl.
*G06F 9/44* (2018.01)
*G06F 9/445* (2018.01)
(Continued)

(52) U.S. Cl.
CPC .......... *G06F 9/4451* (2013.01); *G06F 9/5072* (2013.01); *G06F 18/214* (2023.01); *G06N 20/10* (2019.01)

(58) Field of Classification Search
CPC .... G06F 9/4451; G06F 18/214; G06F 9/5072; G06N 20/10
See application file for complete search history.

(56) References Cited

U.S. PATENT DOCUMENTS 7,218,604 B2 5/2007 Hosur et al.
7,248,879 B1 7/2007 Walton et al.
(Continued)

FOREIGN PATENT DOCUMENTS

EP 1739533 A2 1/2007
JP 2000174675 A 6/2000
(Continued)

OTHER PUBLICATIONS

Communication Pursuant to Article 94(3) Received for European Application No. 08005782.1, mailed on Sep. 22, 2015, 5 pages.
(Continued)

*Primary Examiner* — Zahid Choudhury

(57) ABSTRACT

The present disclosure describes automated generation of early warning predictive insights derived from contextual analysis of user activity data of a distributed software platform. Predictive insights are automatically generated from analysis of user activity through implementation of trained artificial intelligence (AI) modeling. User activity data is accessed pertaining to user interactions by a plurality of users on a software data platform. The trained AI modeling generates a plurality of mobility determinations that identify changes in patterns of user behavior over a current temporal filter associated with the user activity data. The plurality of mobility determinations is curated using business logic rules that evaluate a relevance of the mobility determinations. One or more predictive insights may be generated and presented via a graphical user interface notification. Exemplary notifications help provides insights into (Continued)

100 how user behavior has changed and why that is, thereby fostering understanding of predictions that can lead to actionable results.

20 Claims, 8 Drawing Sheets

Related U.S. Application Data

(60) Provisional application No. 63/166,562, filed on Mar. 26, 2021.

(51) Int. Cl.
| | |
|---|---|
| *G06F 9/50* | (2006.01) |
| *G06F 18/214* | (2023.01) |
| *G06N 20/10* | (2019.01) |

(56) References Cited

U.S. PATENT DOCUMENTS

| | | | | |
|---|---|---|---|---|
| 7,620,174 | B1 | 11/2009 | Bick | |
| 7,668,188 | B2 | 2/2010 | Chang et al. | |
| 7,706,456 | B2 | 4/2010 | Laroia et al. | |
| 8,593,932 | B2 | 11/2013 | Laroia et al. | |
| 2003/0206202 | A1 | 11/2003 | Moriya | |
| 2004/0001555 | A1 | 1/2004 | Taffin et al. | |
| 2004/0119763 | A1 | 6/2004 | Mizobuchi et al. | |
| 2005/0041572 | A1 | 2/2005 | Dottling et al. | |
| 2005/0138630 | A1 | 6/2005 | Reynolds | |
| 2006/0104379 | A1 | 5/2006 | Li et al. | |
| 2006/0250944 | A1 | 11/2006 | Hong et al. | |
| 2008/0225965 | A1 | 9/2008 | Pi et al. | |
| 2008/0259045 | A1 | 10/2008 | Kim | |
| 2009/0143661 | A1* | 6/2009 | Taub | A61B 5/14546 |
| | | | | 600/365 |
| 2010/0118800 | A1 | 5/2010 | Kim et al. | |
| 2010/0246717 | A1 | 9/2010 | Aldana | |
| 2012/0306660 | A1* | 12/2012 | Stopel | H04W 4/029 |
| | | | | 340/686.1 |
| 2019/0069279 | A1 | 2/2019 | Kim et al. | |

FOREIGN PATENT DOCUMENTS

| | | | |
|---|---|---|---|
| JP | 2003504933 | A | 2/2003 |
| KR | 20030065674 | A | 8/2003 |
| WO | 9848554 | W | 10/1998 |
| WO | 03034640 | A1 | 4/2003 |
| WO | 2006117438 | A1 | 11/2006 |
| WO | 2006130541 | A2 | 12/2006 |

OTHER PUBLICATIONS

Communication Under Rule 71(3) Received for European Application No. 08005782.1, mailed on May 20, 2016, 5 pages.

Decision to Grant Received for European Application No. 08005782.1, mailed on Jul. 28, 2016, 2 pages.

Final Office Action mailed on Feb. 22, 2018, in U.S. Appl. No. 15/437,659, 18 pages.

International Search Report and Written Opinion received for PCT Application No. PCT/KR2008/002093, Aug. 18, 2008, 5 pages.

Kddi et al. "L1/L2 Control Channel Structure with CDM Based Multiplexing in E-UTRA Downlink", 3GPP TSG RAN WG1 meeting #48 bis, St. Julians, Malta, Mar. 26-30, 2007, R1-071702 (original R1-070885), 8 pages.

Kusume, et al., "Cyclically shifted multiple interleavers." In Proceedings of the Global Telecommunications Conference, 2006, 5 Pages.

Lee et al. "Space-time bit-interleaved Coded Modulation for OFDM Systems." IEEE Transactions on Signal Processing, vol. 52, Issue No. 3, 2004, pp. 820-825.

Non-Final Office Action mailed on Apr. 26, 2013, in U.S. Appl. No. 13/554,914, 8 pages.

Non-Final Office Action mailed on Aug. 11, 2017, in U.S. Appl. No. 15/437,659, 11 pages.

Non-Final Office Action mailed on Jul. 26, 2019, in U.S. Appl. No. 16/158,671, 22 pages.

Non-Final Office Action mailed on Nov. 13, 2015, in U.S. Appl. No. 14/703,437, 31 pages.

Non-Final Office Action mailed on Oct. 5, 2011, in U.S. Appl. No. 12/451,093, 9 pages.

Non-Final Office Action mailed on Oct. 8, 2014, in U.S. Appl. No. 13/928,148, 6 pages.

Non-Final Office Action mailed on Oct. 8, 2014, in U.S. Appl. No. 14/106,239, 6 pages.

Notice of Allowance mailed on Apr. 5, 2016, in U.S. Appl. No. 14/703,437, 8 pages.

Notice of Allowance mailed on Feb. 2, 2015, in U.S. Appl. No. 14/106,239, 8 pages.

Notice of Allowance mailed on Jan. 30, 2015, in U.S. Appl. No. 13/928,148, 8 pages.

Notice of Allowance mailed on Jul. 5, 2018, in U.S. Appl. No. 15/437,659, 9 pages.

Notice of Allowance mailed on Jun. 15, 2011, in U.S. Appl. No. 12/058,655, 14 pages.

Notice of Allowance Mailed on May 10, 2012, in U.S. Appl. No. 12/451,093, 7 Pages.

Notice of Allowance mailed on Nov. 8, 2016, in U.S. Appl. No. 15/207,257, 8 pages.

Notice of Allowance mailed on Oct. 23, 2019, in U.S. Appl. No. 16/158,671, 8 pages.

Notice of Allowance mailed on Sep. 20, 2013, in U.S. Appl. No. 13/554,914, 8 pages.

Office Action received for Indian Patent Application No. 4866/CHENP/2015, mailed on Sep. 27, 2021, 6 Pages.

Texas Instruments., "Multiplexing PDCCH Grants in E-UTRA Downlink", 3GPP TSG RAN WG1 #48 bis, St. Julians, Malta, Mar. 26-30, 2007, R1-071490, 4pages.

* cited by examiner

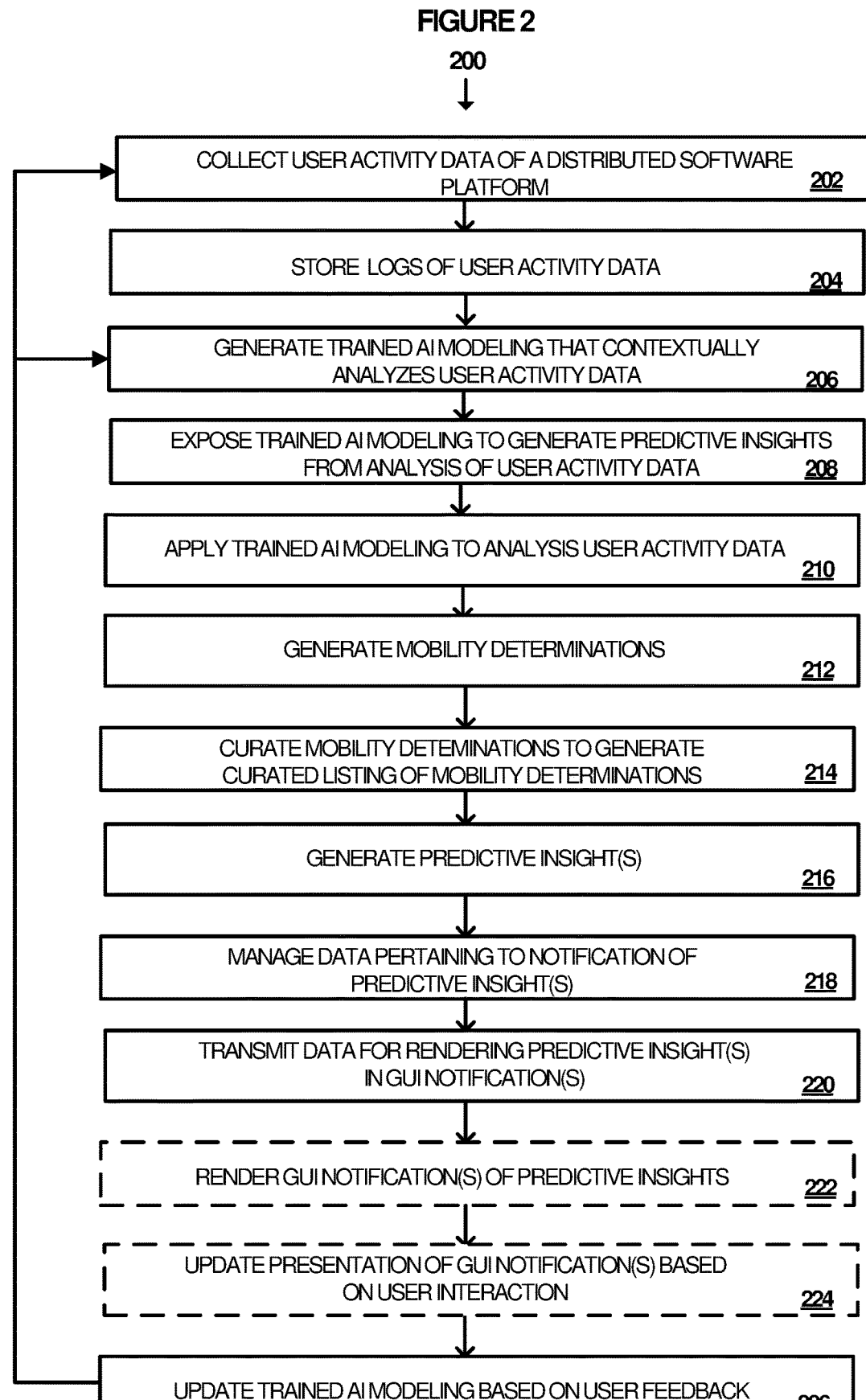

COLLECT USER ACTIVITY DATA OF A DISTRIBUTED SOFTWARE PLATFORM     202

STORE LOGS OF USER ACTIVITY DATA     204

GENERATE TRAINED AI MODELING THAT CONTEXTUALLY ANALYZES USER ACTIVITY DATA     206

EXPOSE TRAINED AI MODELING TO GENERATE PREDICTIVE INSIGHTS FROM ANALYSIS OF USER ACTIVITY DATA     208

APPLY TRAINED AI MODELING TO ANALYSIS USER ACTIVITY DATA     210

GENERATE MOBILITY DETERMINATIONS     212

CURATE MOBILITY DETEMINATIONS TO GENERATE CURATED LISTING OF MOBILITY DETERMINATIONS     214

GENERATE PREDICTIVE INSIGHT(S)     216

MANAGE DATA PERTAINING TO NOTIFICATION OF PREDICTIVE INSIGHT(S)     218

TRANSMIT DATA FOR RENDERING PREDICTIVE INSIGHT(S) IN GUI NOTIFICATION(S)     220

RENDER GUI NOTIFICATION(S) OF PREDICTIVE INSIGHTS     222

UPDATE PRESENTATION OF GUI NOTIFICATION(S) BASED ON USER INTERACTION     224

UPDATE TRAINED AI MODELING BASED ON USER FEEDBACK     226

Figure 3A:
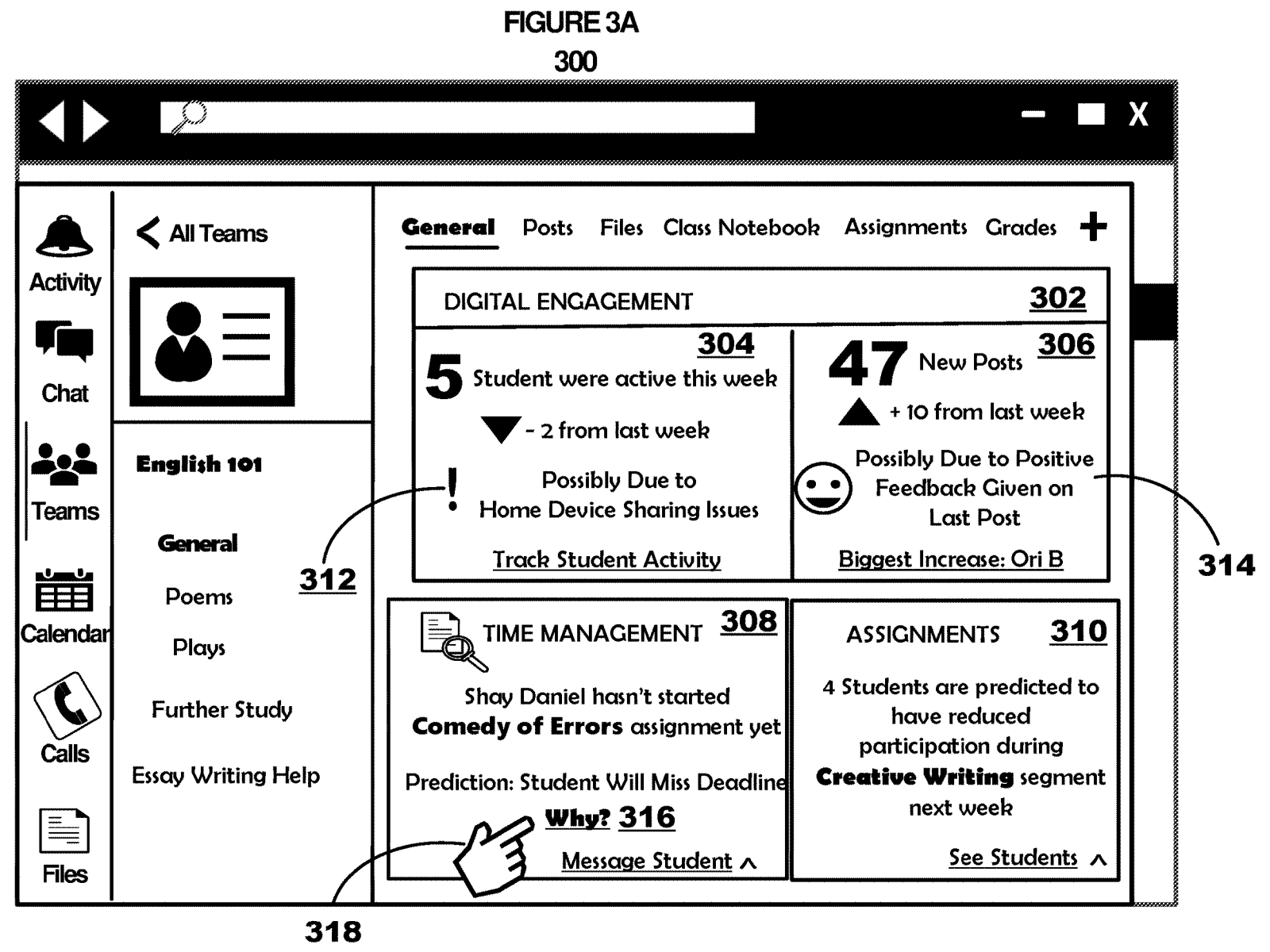

< All Teams

English 101

General

Poems

Plays

Further Study

Essay Writing Help

Activity

Chat

Teams

Calendar

Calls

Files

General  Posts  Files  Class Notebook  Assignments  Grades  +

302

DIGITAL ENGAGEMENT  304

5 Student were active this week

▶ - 2 from last week

Possibly Due to
Home Device Sharing Issues

Track Student Activity

312

306

47 New Posts

▲ + 10 from last week

😊  Possibly Due to Positive
Feedback Given on
Last Post

Biggest Increase: Ori B

TIME MANAGEMENT  308

Shay Daniel hasn't started
Comedy of Errors assignment yet

Prediction: Student Will Miss Deadline

Why? 316

Message Student ∨

318

ASSIGNMENTS  310

4 Students are predicted to
have reduced
participation during
Creative Writing segment
next week See Students ∨

320

340

AUTOMATED GENERATION OF EARLY WARNING PREDICTIVE INSIGHTS ABOUT USERS

CROSS REFERENCE TO RELATED PATENT APPLICATIONS

This application is a non-provisional application that claims priority to U.S. Provisional Patent Application No. 63/166,562 entitled "AUTOMATED GENERATION OF EARLY WARNING PREDICTIVE INSIGHTS ABOUT USERS", filed on Mar. 26, 2021, and U.S. patent application Ser. No. 17/306,847 entitled "AUTOMATED GENERATION OF EARLY WARNING PREDICTIVE INSIGHTS ABOUT USERS", filed on May 3, 2021, which are hereby incorporated by reference herein, in their entirety.

BACKGROUND

Traditional processing for early warning notifications focuses on tracking user progress in a course relative to completion of assigned content by students. Associated predictions are typically directed to determining whether a user is on track to complete a course based on assignment completion and an associated grade. Typically, notifications are raised only after a user missed an assignment or receives a low grade because those results may affect the larger goal of successfully completing a class/course. While those types of analytics are useful to track the progress of a student relative to completion of a course as a whole, they do not provide a deeper understanding as to why a student may have missed an assignment or received a bad grade. As such, it stands that predictive outcome insights can be greatly improved by providing a deeper understanding of user activity during online learning.

Yet another technical challenge stems from understanding how to manage activity data pertaining to user engagement with online learning tools. Activity data is voluminous and weakly correlated, making it extremely difficult to generate meaningful data insights. Processing of such a large amount of weakly correlated data requires significant computational resources, which would further need to be programmed for that specific purpose of data insight generation. Challenges further arise when considering processing efficiency and latency issues, where results often need to be generated in real-time (or near real-time) to be effective. This is especially true when trying to generate early warning notifications for educational progress.

Further technical challenges exist in the realm of e-learning. Traditional evaluation of e-learning activity offers a partial/sparse view of a student's overall learning activity. This makes it difficult generate contextually relevant user-specific insights for students and further frame insights in a way that other users (e.g., teachers, parents) can intervene to address a downward trend.

SUMMARY

For resolution of the above identified technical problems, as well as other reasons, there is a technical need for automated generation of early warning predictive insights derived from contextual analysis of user activity data of a distributed software platform. As a non-limiting example, predictive insights are automatically generated from analysis of user activity data associated with an educational software platform through implementation of trained artificial intelligence (AI) modeling. For ease of understanding of the present disclosure, education is used as an exemplary domain, but it is to be recognized that processing of the present disclosure is applicable to be customized for any type of domain. Continuing with education as an example domain, user activity data is accessed pertaining to user interactions by a plurality of users with the educational software platform. The trained AI modeling generates a plurality of mobility determinations that identify changes in patterns of user behavior over a current temporal filter associated with the user activity data. The plurality of mobility determinations is curated based on an application of business logic rules that are used to evaluate a relevance of the mobility determinations. In some further instances, an exemplary system is tuned to focus on specific types of mobility determinations (e.g., downward trends and/or up-trending mobility). For example, an exemplary system is calibrated to alert on teachers on potential drops in engagement of students. One or more predictive insights may be generated and presented via a graphical user interface (GUI) notification. Exemplary notifications help provides insights into how user behavior has changed and why that is, thereby fostering understanding of predictions that can lead to actionable results. In the age of hybrid/mixed learning, it has become more evident that teachers can no longer fully rely on direct interaction with the student to monitor a student's wellbeing and learning progress. As such, the present disclosure assists teachers by mining behavioral patterns to alert on potential drops in key indicators can provide an invaluable spotlight to focus a teacher's attention to students in need of support, possibly before their need escalates creating sustained lagging compared to their peers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 2 illustrates exemplary method related to automatic generation of mobility determinations and management of predictive data insights derived therefrom, with which aspects of the present disclosure may be practiced.

FIGS. 3A-3C illustrate exemplary processing device views associated with user interface examples for an improved user interface that is adapted for generation and management of predictive data insights from management of mobility determinations, with which aspects of the present disclosure may be practiced.

DETAILED DESCRIPTION

Figure 1A:
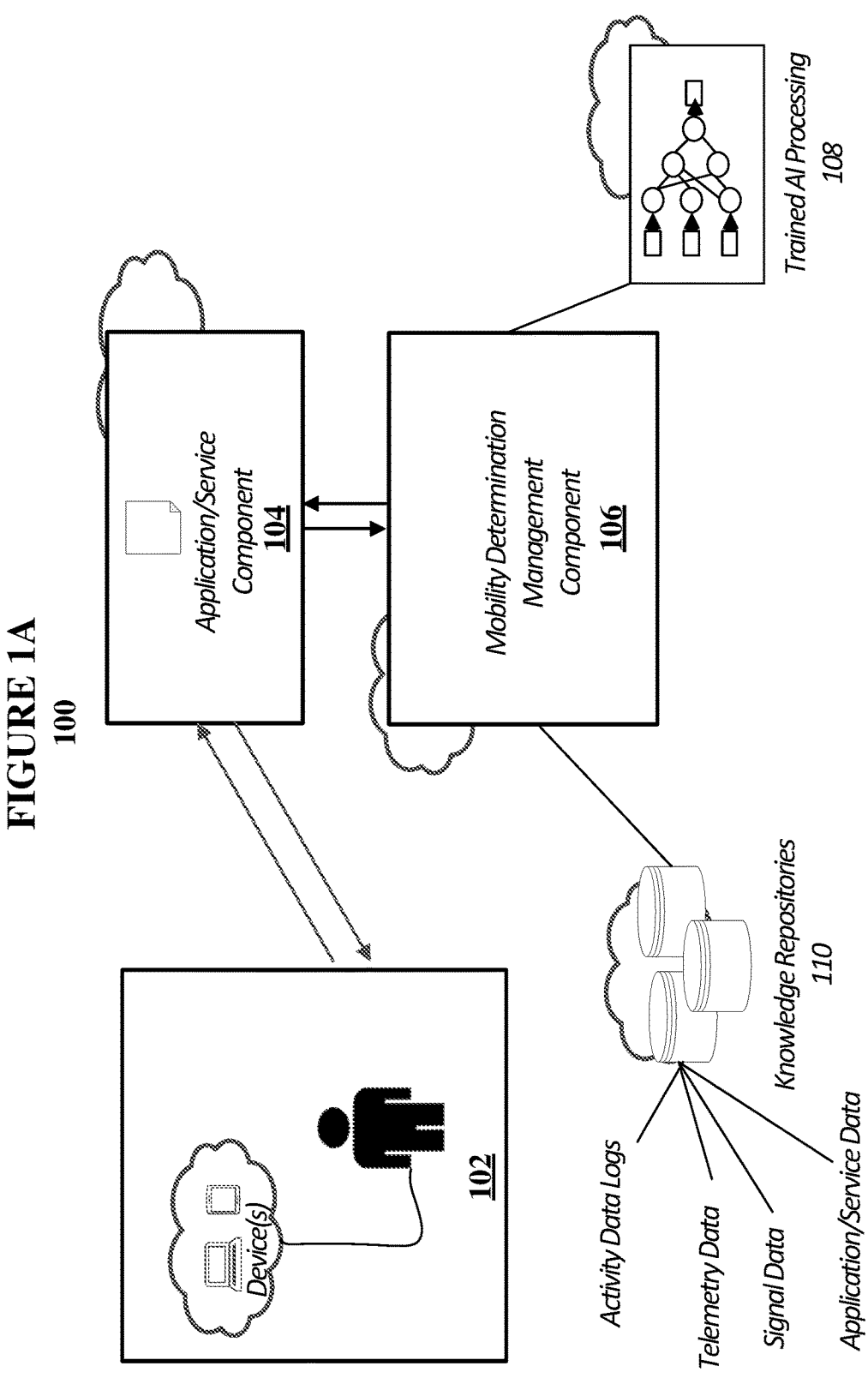
FIG. 1A illustrates an exemplary system diagram of components interfacing to enable automatic generation of mobility determinations from which predictive data insights can be generated pertaining to usage of system/service, with which aspects of the present disclosure may be practiced.

As identified in the foregoing, there is a technical need for automated generation of early warning predictive insights derived from contextual analysis of user activity data of a distributed software platform. As a non-limiting example, predictive insights are automatically generated from analysis of user activity data associated with an educational software platform through implementation of trained artificial intelligence (AI) modeling. For ease of understanding of the present disclosure, education is used as an exemplary domain, but it is to be recognized that processing of the present disclosure is applicable to be customized for any type of domain.

Continuing with an education example, an educational platform enables students, teachers, administrators, parents, etc., to be connected through customized versions of software products that helps guide learning (online, in-person and/or hybrid learning) and management of associated educational data. Integration of educational platforms provide online learning resources and implementation of the same is known to one skilled in the field of art. As a point of reference, capabilities of an educational platform comprise but are not limited to: registering students in courses; conducting online learning/classes; document storage, retention and management; documenting submission and gradings, transcripts, results of student tests and other assessments; management of access to content provided for learning; building student schedules; tracking student attendance; managing data for extracurricular activities; and managing student-related data needs in a school, among other examples. One example of a well-known software data platform is MICROSOFT365®, which may be tailored for management of a specific document (e.g., education). In an educational domain example, applications/services of a software data platform (e.g., MICROSOFT365®) are tailored to further educational experiences for users. For instance, an online classroom and resources for management of associated users, content, etc., are enabled through MICROSOFT® Education thereby providing an online learning (or hybrid learning) environment.

In one non-limiting example, user activity data is accessed pertaining to user interactions by a plurality of users with the educational software platform. A trained AI modeling generates a plurality of mobility determinations that identify changes in patterns of user behavior over a current temporal filter associated with the user activity data. The plurality of mobility determinations is then curated based on an application of business logic rules that are used to evaluate a relevance of the mobility determinations. One or more predictive insights may be generated and presented via a GUI notification. Exemplary notifications help provides insights into how user behavior has changed and why that is, thereby fostering understanding of predictions that can lead to actionable results.

Mobility determinations are identified changes that indicate the beginning of a trend/pattern for which predictive data insights can then be generated and presented as early warning indications pertaining to user activity. The idea is that early warning indications, as well as contextual understanding of the same, enable users to change their behavior to affect a predicted outcome before it is too late to do so. Mobility determinations provide a deeper level of understanding of user interaction that are reflective of how deeply a student is currently engaging with content of an organization (e.g., a class) within a recent period of time relative to user interactions by other users (e.g., classmates and/or teachers). For instance, current user activity of a user (e.g., within a recent predetermined period of time) is comparatively evaluated in a number of different ways, including: directly with historical user activity of that user; and relative to user activity (current and/or historic) of other users (e.g., classmates, teachers). Notably, as a group of students is being evaluated collectively (e.g., user activity of a student relative to its other classmates both current and past), subtle changes in user interactions/behaviors over a short period of time, that are not indicative of a trend/pattern, can be ignored. In some instances, those user interactions and behaviors can still become a trend/pattern, for example, when a subsequent round of evaluation commences. Applied business logic rules identify thresholds for evaluating changes in student behavior/interactions relative to current and past performance of a class collectively. For example, a business logic rule is used to set threshold that defines how large a change (deviation) in user activity is required to even register as a mobility determination.

While a relative evaluation between classmates provides an effective baseline to evaluate student behavior, it is also to be recognized that student behavior can change relative to activity of a teacher/professor. As such, the present disclosure applies trained AI processing that correlates user activity data across multiple relative considerations to automatically generate accurate and precise predictive insights. That is, trained AI processing is applied to correlate user activity data in a relative manner to identify changes in user behavior for a recent period of time and provide rationale as to why those changes are occurring.

Furthermore, mobility determinations and predictive insights of the present disclosure are intelligent because processing described herein factors in business logic that is reflects real-world considerations when identified changes in user behavior. For instance, programmed rules can be applied that tailor a contextual analysis for to unbiasedly evaluate behavior of users relative to one another. In an educational scenario, external factors that may affect user behavior which should be controlled to remove bias include but are not limited to: life events, school schedules, holidays, device access, pandemics, etc. Through training of a classifier, an AI model can further apply business logic to correlate patterns of user behavior with such external factors and remove potential biases found when correlating raw signal data. For instance, relevance analysis is applied that curates/prunes data correlations to derive the most contextually relevant mobility determinations. Based on results of relevance analysis, predictive data insights are automatically generated. Predictive data insights are uniquely distinct from predictive outcomes that exclusively focus on user task completion and grading of how well a user completed a given task (e.g., assignment, exam).

As an example, say that signal data pertaining to user engagement with weekly lesson content indicates that a student is at the top of the class with respect to lesson participation. When a predictive data insight of the present disclosure is generated, a prediction may come in indicating that the student is on track to have a much lower engagement in lesson participation over the next week (e.g., set as a current temporal filter). Notification of such context provides an early warning alert to the student and/or teacher so that the student can adjust its engagement in lesson participation before it may affect the student's grade. Additionally, correlation of user activity data over the current temporal filter is used to identify a rationale as to why a lower engagement level is being predicted. For instance, it may be determined that a user damaged its laptop, which is normally used to login, and has logged in over the last two sessions from another device that is shared with other users. This can result in limiting the screen time a student has, where historically they may have been more proactive about accessing lesson materials. Additionally, as trained AI processing is applied to automatically generate mobility determinations and generate predictive insights therefrom, the correlated data that is used to derive a mobility determination is identifiable. As such, key data that was identified as a basis for generating a prediction can be identified as talking points to help other users (e.g., a teacher, school administrators, parents) understand the context surrounding a prediction. This helps foster actionable intervention to avoid a negative outcome.

Exemplary technical advantages provided by processing described in the present disclosure comprise but are not limited to: improved server-side processing for management of user activity data to generate meaningful early warning indications that are contextually relevant and understandable; generation and application of novel trained AI processing that is adapted to generate predictive insights from contextual relevance analysis of user activity data of a distributed software platform (e.g., educational software platform); novel relevance analysis applied by trained AI processing that analyzes historical and current iterations of user activity data in a contextually relative manner (e.g., across peers and/or based on user interactions from different types of users); automatic generation of mobility determinations that are usable to generate predictive insights; automatic generation of predictive insights that are derived from analysis of user activity data and are usable as early warning notifications; an improved user interface (GUI) adapted to provide notifications of predictive insights which are extensible to be integrated within GUIs of a plurality of applications/services associated with a distributed software platform; improved processing efficiency (e.g., reduction in processing cycles, saving resources/bandwidth) for computing devices when generating and rendering notifications including predictive insights; reduction in latency through efficient processing operations that improve correlation of content among different applications/services including integration of exemplary notifications inline within different host application/service endpoints; improve accuracy and precision in application of trained AI processing when generating predictive outcomes associated with a domain (e.g., an education-specific domain); and improving usability of host applications/services for users via integration of processing described herein, among other technical advantages.

FIG. 1A illustrates an exemplary system diagram 100 of components interfacing to enable automatic generation of mobility determinations from which predictive data insights can be generated pertaining to usage of system/service, with which aspects of the present disclosure may be practiced. As an example, components illustrated in system diagram 100 may be executed by an exemplary computing system 401 (or multiple computing systems) as described in the description of FIG. 4. System diagram 100 describes components that may be utilized to execute processing operations described in process flow 120 (FIG. 1B), process flow 150 (FIG. 1C) method 200 (FIG. 2) as well as processing described in and associated with visual diagrams of FIGS. 3A-3C and the accompanying description. Moreover, interactions between components of system diagram 100 may be altered without departing from the spirit of the present disclosure. Exemplary components, described in system diagram 100, may be hardware and/or software components, which are programmed to execute processing operations described herein. In some examples, components of system diagram 100 may each be one or more computing devices associated with execution of a specific service. Exemplary services may be managed by a software data platform (e.g., educational software platform) that also provides, to a component, access to and knowledge of other components that are associated with applications/services. In one instance, processing operations described in system diagram 100 may be implemented by one or more components connected over a distributed network, where a user account may be working with a specific profile established through a distributed software platform. System diagram 100 comprises user computing devices 102; an application/service component 104; a mobility determination management component 106; a component for implementation of trained AI processing 108; and knowledge repositories 110.

System diagram 100 comprises user computing device(s) 102. An example of a user computing device 102 is a computing system (or computing systems) as described in the description of FIG. 4. User computing device(s) 102 are intended to cover examples where a computing device is a client computing device that is executing an application or service configured to enable access a distributed software platform.

The application/service component 104 is one or more computer components (hardware, software or a combination thereof) configured to manage host applications/services and associated endpoints. As previously references, the application/service endpoint component 108 interfaces with other computer components of system diagram 100 to enable management of presentation of exemplary notifications in a contextually relevant manner (e.g., inline with content of a specific host application/service endpoint). An application/service component 104 further manages presentation of a GUI usable to present an exemplary notification and foster user interaction therewith. A host application/service configured to enable execution of tasks by one or more user accounts. Non-limiting examples of host applications/services that are applicable in the present disclosure comprise but are not limited to: educational information management applications/services; open-source collaborative framework applications/services (e.g., MICROSOFT® FLUID®; video discussion applications/services; word processing applications/services; spreadsheet applications/services; notes/notetaking applications/services; authoring applications/services; digital presentation applications/services; presentation broadcasting applications/services; search engine applications/services; email applications/services; messaging applications/services; web browsing applications/services; collaborative communication applications/services; digital assistant applications/services; webpage building applications/service; directory applications/services; mapping services; calendaring services; electronic payment services; digital data storage or distributed data storage applications/services; web conferencing applications/services; call communication applications/services; language understanding applications/services; bot framework applications/services; networking applications/services; social networking applications/services; and suites of applications/services that may collectively comprise a combination of one or more of the previously mentioned applications/services including education-specific versions of any of the previously mentioned host applications/services, among other examples. The application/service component 104 further manages respective endpoints associated with individual host applications/services, which have been referenced in the foregoing description. In some examples, an exemplary host application/service may be a component of a distributed software platform providing a suite of host applications/services and associated endpoints. A distributed software platform is configured to providing access to a plurality of applications/services, thereby enabling cross-application/service usage to enhance functionality of a specific application/service at run-time. For instance, a distributed software platform enables interfacing between a host service related to management of a distributed collaborative canvas and/or individual components associated therewith and other host application/service endpoints (e.g., configured for execution of specific tasks). Distributed software platforms may further manage tenant configurations/user accounts to manage access to features, applications/services, etc. as well access to distributed data storage (including user-specific distributed data storage). Moreover, specific host application/services (including those of a distributed software platform) may be configured to interface with other non-proprietary application/services (e.g., third-party applications/services) to extend functionality including data transformation and associated implementation.

Signal data associated with specific applications/service may be collectively analyzed to generation determinations described herein including those where the mobility determination management component 106 and/or component implementing the trained AI processing 108 are executing importance/relevance scoring/ranking to automatically generate determinations described herein. For instance, application of trained AI model (or models) may be trained to evaluate not only user activity data but other types of contextual data including past and/or current user actions, user preferences, application/service log data, etc., that are each associated with one or more user accounts. This additional signal data analysis may help yield determinations as to how (and when) to present exemplary GUI notifications to users. Notably, different users (e.g., students, teachers, school administrators, parents) may be utilizing an educational software platform, where GUI notifications can be contextually rendered from analysis of signal data that is customized for a user. Non-limiting examples of signal data that may be collected and analyzed comprises but is not limited to: device-specific signal data collected from operation of one or more user computing devices; user-specific signal data collected from specific tenants/user-accounts with respect to access to any of: devices, login to a distributed software platform, applications/services, etc.; application-specific data collected from usage of applications/services and associated endpoints; or a combination thereof. Analysis of such types of signal data in an aggregate manner may be useful in helping generate contextually relevant determinations, data insights, etc. Analysis of exemplary signal data may comprise identifying correlations and relationships between the different types of signal data, where telemetric analysis may be applied to generate determinations with respect to a contextual state of user activity with respect to different host application/services and associated endpoints.

The application/service component 104 is further configured to present, through interfacing with other computer components of system diagram 101, an adapted GUI that provides user notifications, GUI menus, GUI elements, etc., to manage rendering of message notifications and automatic notifications thereof.

The mobility determination management component 106 is one or more computer components (hardware, software or a combination thereof) configured to execute and manage processing operations related to generation and provision of mobility determinations, predictive insights generated therefrom as well as generation of exemplary GUI notifications. The mobility determination management component 106 is configured to execute any processing operations described herein, including those described relative to system diagram 100 (FIG. 1A), process flow 120 (FIG. 1B), process flow 150 (FIG. 1C), method 200 (FIG. 2), and processing associated with visual diagrams of FIGS. 3A-3C and further described in the accompanying description. It is further to be recognized that an order of execution of processing operations by the mobility determination management component 106 may vary without departing from the spirit of the present disclosure.

As referenced in the foregoing description, the mobility determination management component 106 and/or the application/service component 104 are configured to interface with a component for implementation of trained AI processing 108 to aid processing in various contextual scenarios. The component for implementation of trained AI processing is configured to manage implementation of one or more trained AI models. Implementation of trained AI modeling including creating, adapting, training, and updating of trained AI processing is known to one skilled in the field of art. Trained AI processing is applicable to aid any type of determinative or predictive processing including specific processing operations described about with respect to determinations, classification ranking/scoring and relevance ranking/scoring. Moreover, a component for implementation of a programmed software module and/or trained AI processing 110 may be applied to aid generation of processing determinations of other components of system diagram 100. An exemplary component for implementation trained AI processing 108 may manage AI modeling including the creation, training, application, and updating of AI modeling. In cases where trained AI processing is applied, general application of trained AI processing including creation, training and update thereof is known to one skilled the field of art. Above what is traditionally known, trained AI processing may be adapted to execute specific determinations described herein with reference to any component of system diagram 100 and processing operations executed thereby. For instance, an AI model may be specifically trained and adapted for execution of processing operations comprising but not limited to: collecting and analyzing user activity data; generating mobility determinations; curating mobility determinations; generating predictive insights; generating GUI notifications for predictive insights; executing data correlation and relevance analysis; generating confidence scoring for selective output of predictive insights; and generation of data for rendering GUI content and updates, among other examples. Exemplary AI processing may be applicable to aid any type of determinative or predictive processing by any components of system diagram 100, via any of: supervised learning; unsupervised learning; semi-supervised learning; or reinforcement learning, among other examples. Non-limiting examples of supervised learning that may be applied comprise but are not limited to: nearest neighbor processing; naive bayes classification processing; decision trees; linear regression; support vector machines (SVM) neural networks (e.g., convolutional neural network (CNN) or recurrent neural network (RNN)); and transformers, among other examples. Non-limiting of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting of semi-supervised learning that may be applied comprise but are not limited to: assumption determination processing; generative modeling; low-density separation processing and graph-based method processing, among other examples. Non-limiting of reinforcement learning that may be applied comprise but are not limited to: value-based processing; policy-based processing; and model-based processing, among other examples. Furthermore, a component for implementation of trained AI processing 108 may be configured to apply a ranker to generate relevance scoring to assist with any processing determinations with respect to any relevance analysis described herein. Non-limiting examples of relevance scoring, and specific metrics used for relevance scoring have been referenced in the foregoing description and are subsequently described including the description of method 200 (FIG. 2). Scoring for relevance (or importance) ranking may be based on individual relevance scoring metrics described herein or an aggregation of said scoring metrics. In some alternative examples where multiple relevance scoring metrics are utilized, a weighting may be applied that prioritizes one relevance scoring metric over another depending on the signal data collected and the specific determination being generated. Results of a relevance analysis may be finalized according to developer specifications. This may comprise a threshold analysis of results, where a threshold relevance score may be comparatively evaluated with one or more relevance scoring metrics generated from application of trained AI processing.

Continuing examples where a domain is education, a proprietary deep learning model (attention model) is built and trained to identify behavioral patterns that predict individual activity of a student given a sequence of student interactions. As previously indicated, student interactions are considered relative to actions by other students (e.g., classmates). The model applies a proprietary, student-centric (personalized) self-attention mechanism to consider patterns of classmates along with the patterns of the student of interest when making a prediction on said student. A deep learning model of the present disclosure focuses on evaluation of user activity rather than performance outcomes and is therefore able to provide interpretable outcomes that prescribe actionable suggestions to users (e.g., educators, parents). Consider an example where a student is less active in recent weeks but not to the level at which the teacher and/or descriptive statistics indicate a significant drop. This type of analysis may be useful to a teacher enabling identification of any trends (e.g., down-trend) providing an early warning indication to the educator with enough context to enable proactive intervention.

A trained AI model is generated to be a robust model that can understand intricacies of domain-specific scenarios. For instance, millions of logs of user data are collected, aggregated, analyzed, and used to train an AI model for a contextual understanding of user activity over an educational year. For training purposes, a rolling window may be implemented to specify a time period (temporal filter) across aggregated data. Training tunes an AI model to understand scenarios that may impact students as a whole (e.g., over specific time periods) and avoid bias against an individual student in an assessment of that student. For instance, student participation may be less over certain periods of time during a school year because schools may be on break (e.g., winter break, spring break, summer break). If students have days off, that should not be counted against them as a reason why their participation may be lower over a given time period. Similarly, real-time execution of a trained AI model is adapted, through training and implementation of business logic (applied business logic rules), to provide context for executing an unbiased assessment of a student. The business logic rules are configured for an education domain of the educational software platform and used to evaluate a relevance of the mobility determinations generated by a trained AI model. In some examples, specific business logic rules may further be directed to contextual scenarios that are specific to a school/university, school district, school, class/course, etc. In this way, a trained AI Model can identify students in similar circumstances as a baseline for evaluating user behavior.

One type of attention model may focus on user interactions pertaining to assignments issued for a class/course. In alternative examples, an exemplary attention model may be trained to focus on other educational aspects including but not limited to: user participation; attendance; user collaboration; examinations, or a combination thereof. It is to be recognized that in an assignment example, any of those previously mentioned signals can be evaluated relative to the issuance of an assignment, homework, testing, etc. For each student assignment, all signals (signal data) that correspond to it are taken as input. As previously indicated, signal data may be signal data pertaining to access by a specific user relative to a student assignment; signal data pertaining to access by other users (e.g., classmates, teachers, parents) relative to a student assignment; signal data pertaining to historical access by one or more users relative to past (and/or similar) student assignments, among other examples.

Signal data collected for a specific event (e.g., student assignment) are treated as a series of events in time, each of which is a collection of features. Specific events are fed to the deep learning modeling which is trained to generate quantiles (or quartiles) for classifying predictions. For every training sequence, each event is composed of multiple features that are separately encoded numerically to an appropriate vector according to their underlying input variable type. Signal data indicated as events contain multiple features each of which is broken down to several input variables. Non-limiting examples of such variables comprise but are not limited to: user identification; item/entity identification; host application/service endpoint; device identification (e.g., used for access); signal data type; timestamp data (e.g., start time/end time; and type of access (e.g., continuous, intermittent), among other examples.

Feature representations are concatenated to an event representation. For example, encoded variables for each feature are concatenated and embedded (or projected) to a lower dimensional, dense vector, representation. The lower dimensional vector representations are further concatenated to provide a single event representation vector. Single event representation vectors are generated for each event in a session. Those single event representation vectors are further evaluated by weighting them by their importance using an attention mechanism applying a linear combination to yield an aggregate session representation. Session representations in semantic session space are used as input to a prediction layer. An attention mask is generated and used to create a weighted sum of event representations, yielding the aggregate session representation.

To avoid a scenario where the trained AI modeling exploits unintended data to make successful predictions, processing is applied to categorize and understand the patterns that the trained AI modeling exploits. Model attention applied in the present disclosure focuses on specific inputs to indicate which parts of the input contributed most to a model's decision. The session representation may then be fed to a fully connected network layer (that ends with a Softmax) on the number of quantiles (or quartiles) that are desired for prediction classification (e.g., top twenty-five percent, top fifty percent, bottom fifty percent bottom twenty-five percent). Ordinal regression loss (or the like) is then applied on the outcome to generate predictions.

Trained AI processing of the present disclosure is further configured to implement additional trained AI modeling, in parallel with a trained attention model, for comparison evaluation and improvement of accuracy and precision of exemplary modeling. For instance, a trained AI model may be implemented based on decision trees for comparative evaluation. Implementation of AI modeling using decision trees is known to one skilled in the field of art. Success of trained AI modeling is evaluated by criteria that comprising: accuracy in target predictions; beating simpler, baseline, approaches; identifying meaningful and interpretable behaviors captured by the model; and robustness to bias. Using either knowledge distillation, or training from scratch, a decision tree/random forest model may be applied to develop a baseline for generating relevant predictions. This processing may comprise applying human-defined business logic (e.g., applicable business rules) configured to target features of interest, thereby turning sequences of events into structured tabular data. The structured tabular data is then introduced to a decision-tree model, which can be further utilized to curate predictions.

Once a successful model is generated, it is important to make sure that bias is avoided, for example, based on a specific user account and/or class/course). In doing so, additional processing may be executed comprising one or more of: evaluating the impact of masking such features; retraining AI modeling without such features to quantify the contribution of personalization to success of the modeling; investigate algorithmic mitigation approaches (e.g., demographic parity) to set a discrimination threshold per group; and execute processing that swaps out attributes of identification (e.g., user account and/or class/course) with random identifiers. Developers can apply one or more of these approaches to tune a trained AI model based on threshold for accuracy and/or precision with respect to results of a trained AI model.

When a model is not successful in proving a hypothesis there are many potential points of failure that can mask each other. Model iteration is applied in training to attempt to isolate, uncover and mitigate potential technical errors. Non-limiting examples of such processing may comprise but is not limited to: verify convergence of the trained AI model on an easier/trivial hypothesis or mock data; investigate learning process using learning telemetry graphs (e.g., rate of change for different layers can indicate there is a gradient propagation issue and lead to the addition of stabilization/regularization layers); hyperparameter tuning and architecture search; introducing new engineered features such as daily/weekly event aggregations to session data and evaluate impact on performance; and evaluate impact of data pooling versus learning a model per class/course to investigate data drift related issues, among other examples. Developers can apply one or more of these approaches to tune a trained AI model based on threshold for accuracy and/or precision with respect to results of a trained AI model.

Additionally, when working within a specific domain (e.g., education), there are additional considerations in correctly applying a successful trained AI model to achieve the desired effect of reporting on mobility. For an education-specific model, attention may be given to remaining assignment duration. This can help identify patterns of user behavior that can indicate whether the user is on track for assignment completion (e.g., normally late in starting assignments or otherwise activity suggests user is on pace to complete assignment on time) or deviating from prior trends. For instance, when a student receives a new assignment, the trained AI model will be applied after every X events/periodically and until Y % of the assignment duration remains. Y will be determined according to the model report (e.g., threshold target may be set similar to something like >30 percent).

Another consideration pertains to mobility resolution and base conditioning. Mobility is a substantial change in quantiles (or quartiles) over time and requires defining the following: resolution (what is substantial). For example, in quantiles (or quartiles) a change can be detected from top twenty-five percent to middle of the class (e.g., top fifty percent). A student that is on average graded around the top three-fourths of a class will tend to fluctuate between the top quantiles (or quartiles). As such, a prediction that calls that student in a quantiles (or quartiles) may not be truly informative. There are a few workarounds to avoid this including but not limited to: increase quantiles (or quartiles) resolution in labeling; reporting on substantial mobility effect size only (e.g., switching from top twenty-five percent quartile to bottom twenty-five percent quartile; and managing base conditioning (derivation over time) with respect to student performance, among other examples. A trained AI model may implement one or more of these approaches when a user based as a whole and/or evaluating specific groups of users. Developers can apply one or more of these approaches to tune a trained AI model based on threshold for accuracy and/or precision with respect to results of a trained AI model.

As referenced in the foregoing description, knowledge repositories 110 may be accessed to manage data aiding operation of any other computer components described in system diagram 100. Knowledge resources comprise any data affiliated with a software application platform (e.g., Microsoft®, Google®, Apple®, IBM®) as well as data that is obtained through interfacing with resources over a network connection including third-party applications/services. Knowledge repositories 110 may be resources accessible in a distributed manner via network connection that may store data usable to improve processing operations described herein. Examples of data maintained by knowledge repositories 110 comprises but is not limited to: activity data logs; generated mobility determinations, predicted insights and GUI notifications; collected signal data (e.g., from usage of an application/service, device-specific, user-specific); telemetry data including past and present usage of a specific user and/or group of users; data for execution of application/services including host application/services and associated endpoints; corpuses of annotated data used to build and train AI processing classifiers for trained AI modeling; access to entity databases and/or other network graph databases usable for evaluation of signal data; web-based resources including any data accessible via network connection including data stored via distributed data storage; trained bots including those for natural language understanding; software modules and algorithms for contextual evaluation of content and metadata; and application/service data (e.g., data of applications/services managed by the application/ service component 104) for execution of specific applications/services including electronic document metadata, among other examples. In even further examples, telemetry data may be collected, aggregated and correlated (e.g., by an interfacing application/service) to further provide computer components of system diagram 100 with on demand access to telemetry data which can aid determinations generated thereby.

Figure 1B:
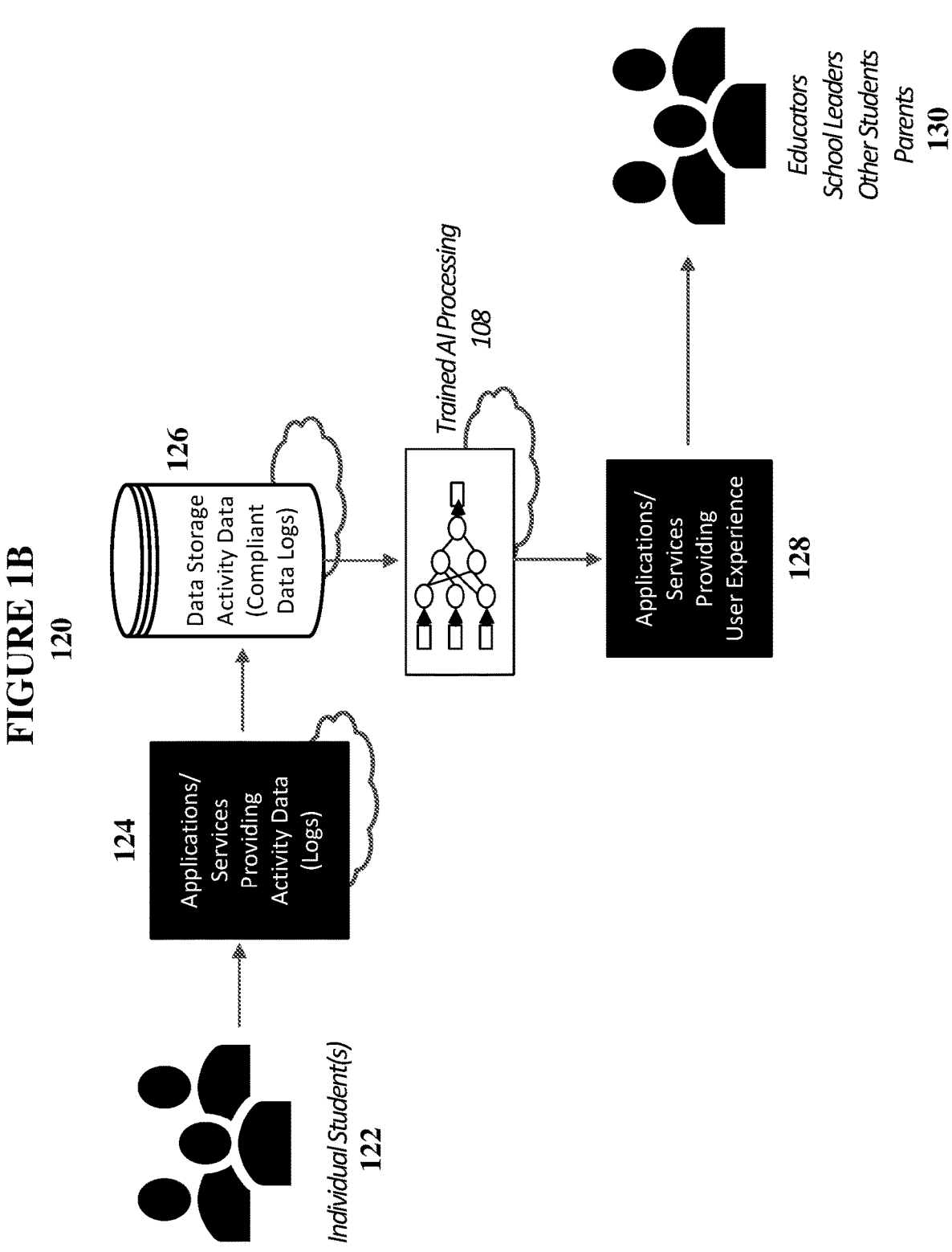
FIG. 1B illustrates an exemplary process flow for generating mobility determinations and provision of predictive data insights to end users, with which aspects of the present disclosure may be practiced.

FIG. 1B illustrates an exemplary process flow 120 for generating mobility determinations and provision of predictive data insights to end users, with which aspects of the present disclosure may be practiced. Process flow 120 illustrates a non-limiting example pertaining to processing of user activity data associated with an educational software platform. Process flow 120 highlights a flow of data relative to trained AI modeling (e.g., via a component for implementation of trained AI processing 108) when providing exemplary GUI notifications comprising predictive insights. Process flow 120 comprises: students 122; a first interaction 124 of applications/services providing user activity data; a data storage of user activity data 126; the component for implementation of trained AI processing 108 (e.g., to manage training of AI modeling and real-time exposure of trained AI modeling); a second interaction 128 of applications/services providing a user experience; and other end users 130 (e.g., educators, school leaders, other students, parents).

As a starting point, process flow 120 shows students 122 (e.g., individual students) which are intended to be an example of users of a domain-specific software data platform. As previously indicated, students 122 may use applications/services of an educational software platform, where logs of user access instances to application/services of the educational software data platform may be created. Logged data of user activity is stored for individual instances of user access and may further be aggregated by user (or as a group of users).

Process flow 120 further illustrates a first interaction 124 of applications/services that provide user activity data. The first interaction 124 is intended to be a representation of the capture of user activity data for analysis. Captured activity data is stored on a data storage of user activity data 126 (e.g., distributed data storage) for subsequent access to execute contextual analysis as described herein. Importantly, it is recognized that user activity data is stored (and accessed) in compliance with privacy laws and regulations. Furthermore, exemplary modeling is trained and executed in a privacy compliant manner where developers never see data due to compliance requirements/restrictions on access to user activity data.

Moreover, process flow 120 illustrates an interaction of the component for implementation of trained AI processing 108, which is used to manage training of AI modeling and real-time exposure of trained AI modeling for generation of predictive insights from exemplary contextual analysis. Trained AI processing (e.g., one or more trained AI models) may be generated, trained and exposed for real-time (or near real-time) analysis of user activity data.

As a result of application of a trained AI model, a second interaction 128 of applications/services provides an end-user experience that surfaces, in a GUI of a host application/ service endpoint, GUI notifications that comprise predictive insights. In the example shown in process flow 120, exemplary GUI notifications, comprising predictive insights, are provided to other end users 130 (e.g., educators, school leaders, other students, parents). For instance, GUI notifications of predictive insights are presented in user-specific renderings of application/services associated with an educational software platform. In alternative examples of process flow 120, GUI notifications can also be presented to the students 122 (individual students) for whom the predictive data insights are generated. This may provide a way in which users can monitor their own user activity and interaction with applications/services of an educational software platform.

Figure 1C:
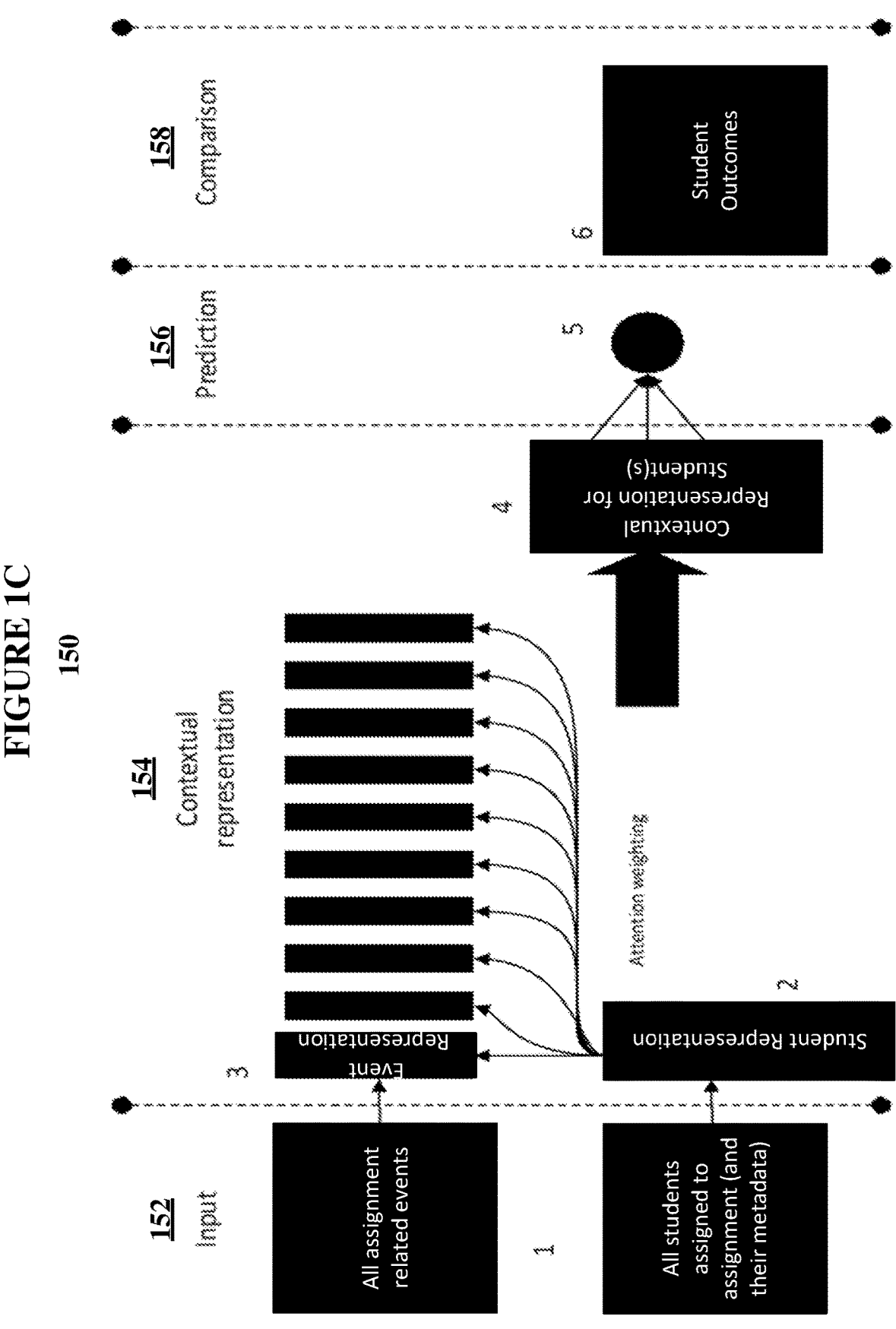
FIG. 1C illustrates an exemplary process flow for generating mobility determinations within an educational software platform, with which aspects of the present disclosure may be practiced.

FIG. 1C illustrates an exemplary process flow 150 for generating mobility determinations within an educational software platform, with which aspects of the present disclosure may be practiced. Process flow 120 highlights processing interactions of trained AI modeling (e.g., via a component for implementation of trained AI processing 108) when generating predictive insights. Process flow 150 comprises: input processing 152; contextual representation 154; prediction processing 156; and comparison processing 158. Further, process flow 150 is labeled with additional numbering (steps 1-6) to help guide one non-limiting example of flow of data when generating predictive insights.

Following the steps (1-6) of process flow 150, step 1 illustrates the introduction of input 152 into a system in the form of user activity data. As indicated in the foregoing description, user activity data may comprise data pertaining to user interactions with applications/services of an educational software platform. For instance, user activity data is logged for all students that are assigned to a specific assignment (and associated metadata) as well as all assignment-related events that occur for those students within an educational software platform.

Steps 2 and 3 of process flow 150 illustrates the application of a trained AI model to generate feature representations from contextual analysis of user activity. From analysis of user activity data by a trained AI model, a contextual representation 154 of the user activity data is generated. Generation of a contextual representation 154 of user activity data comprises generation of a student representation (step 2) of each student assigned to an assignment. Student representations are a feature representation of student user activity pertaining to an assignment. The proprietary attention modeling of a trained AI model is then utilized to generate an event representation (step 3) for each student representation. Event representations are concatenated examples of student representations. For example, encoded variables for each feature are concatenated and embedded (or projected) to a lower dimensional, dense vector, representation. The lower dimensional vector representations are further concatenated to provide a single event representation vector. Single event representation vectors are generated for each event in a session. Those single event representation vectors are further evaluated by weighting them by their importance using an attention mechanism applying a linear combination to yield an aggregate session representation.

Step 4 of process flow 150 is the generation of a contextual representation of one or more students associated with an assignment. A contextual representation is aggregated session representation which is an aggregations of single event representations as a session. Session representations in semantic session space are used as input to a prediction layer. An attention mask is generated and used to create a weighted sum of event representations, yielding the aggregate session representation.

Step 5 of process flow 150 illustrates the application of a prediction layer 156 that analyzes session representations (generation result of contextual representation 154) to generate one or more predictions from analysis of user activity data. As indicated in the present disclosure, a trained AI model analyzes data correlations, relative to the application of business logic rules, to generate predictions from contextual analysis of user activity data.

Step 6 of process flow 150 illustrates the comparison evaluation 158, resulting in the generation of predictive outcomes. Predictive outcomes comparatively evaluate students relative to the user activity of other students. Predictive outcomes are the basis for predictive insights, which can be presented to end users of an educational software platform as early warning indications.

FIG. 2 illustrates exemplary method 200 related to automatic generation of mobility determinations and management of predictive data insights derived therefrom, with which aspects of the present disclosure may be practiced. As an example, method 200 may be executed across an exemplary computing system 401 (or computing systems) as described in the description of FIG. 4. Exemplary components, described in method 200, may be hardware and/or software components, which are programmed to execute processing operations described herein. Non-limiting examples of components for operations of processing operations in method 200 are described in system diagram 100 (FIG. 1A), process flow 120 (FIG. 1B) and process flow 150 (FIG. 1C). Processing operations performed in method 200 may correspond to operations executed by a system and/or service that execute computer modules/programs, software agents, application programming interfaces (APIs), plugins, AI processing including application of trained data models, intelligent bots, neural networks, transformers and/or other types of machine-learning processing, among other examples. In one non-limiting example, processing operations described in method 200 may be executed by a computer component such as: a mobility determination management component 102; an application/service component 104; a component for implementation of trained AI processing 108, or a combination thereof. In distributed examples, processing operations described in method 200 may be implemented by one or more computer components connected over a distributed network. For example, computer components may be executed on one or more network-enabled computing devices, connected over a distributed network, that enable access to user communications.

Method 200 begins at processing operation 202, where user activity data of a distributed software platform is collected. The user activity data is raw signal data received from a plurality of applications or services associated with the educational software platform. An educational software platform is a non-limiting example of a distributed software platform. A distributed software platform is a software system connecting components thereof over a distributed network connection. Implement of components to enable operation of components of a software data platform over a network connection are known to one skilled in the field of art. For instance, a distributed software platform may be backed by one or more services to enable the distributed software platform to be implemented in a variety of technical distributed data scenarios including but not limited to: software as a service (SaaS), platform as a service (PaaS) and infrastructure as a service (IaaS). Moreover, the distributed software platform may support many different programming languages, tools, and frameworks, etc., including both organizationally proprietary systems (e.g., MICROSOFT®-specific) and third-party software and systems including those of independent software vendors.

Collection (processing operation 202) of user activity data occurs as users perform different activities through a software data platform. For instance, a user login to an educational software platform may create a session where signal data may be logged relative to a session of user access to one or more applications/services of a software data platform (e.g., educational software platform). User activity data is recognized as application-specific signal data or service-specific signal data that pertains to user activity received through applications/services associated with the educational platform. Importantly, user activity data that is of interest to the present disclosure is activity data associated with parameters that are behavioral and can be changed relative to a users' interaction with applications/services of the educational platform. Steering away from parameters that are specific to certain classes courses, teaching methods, etc., helps focus an analysis on how a user interaction with specific components, applications/services, etc., can be improved while removing potential for bias. For instance, a user being notified to start an assignment earlier in time can help change a behavior of the student and potentially avoid missing an assignment deadline. Non-limiting examples of user activity data with an educational platform comprises but are not limited to user activity data pertaining to: login information; access (including time and amount of access) to specific content, assignments, posts, feedback/comments, resources, meetings, tests/exams, etc.; starting and completion timing for completing tasks, assignments, etc.; collaborative interactions between users and/or teachers and students; modification of content; posting of content including assignments, exams, etc.; use of features, emojis, etc. and grading, among other examples. Other examples of signal data pertaining to user interactions with an educational platform are known to one skilled in the field of art.

At processing operation 204, logs of user activity data are stored for recall. For instance, user activity data is stored on one or more distributed data storages (or distribute data storage systems). In one example, user activity data is stored via data storage of a file hosting service or a document management storage system. Importantly, it is recognized that user activity data is stored (and accessed) in compliance with privacy laws and regulations. Furthermore, exemplary modeling is trained and executed in a privacy compliant manner where developers never see data due to compliance requirements/restrictions on access to user activity data. As identified in the foregoing description, signal data may be logged relative to a session of user access to one or more applications/services of a software data platform (e.g., educational software platform). For a class of students there is likely a plurality of logs each day of activity. In an educational space, a predictive outcome can either be straight forward (e.g., will a student turn in an assignment on time) or abstract (e.g., is a user going to reduce engagement over a given time period). For instance, a system of the present disclosure can be used to predict what will happen in a given week and provide those predictions as predictive insights and/or early warning indications of decaying performance of a student before it is too late for the teacher to take action and positively influence a behavior of the student.

Flow of method 200 then proceeds to processing operation 206. At processing operation 206, trained AI modeling is generated that is adapted to contextually analyze the user activity data (e.g., of the educational software platform). Generation and management of a trained AI model including training of one or more classifiers is known to one skilled in the field of art. Above what is traditionally known, processing is executed to feed the trained AI model with raw signals pertaining to user activity data of an educational software platform. An exemplary AI model is adapted, through training of a corpus of relevant training data (including sample user activity data and business logic rules), to find patterns on its own based on analysis of: activity data pertaining to current user interactions of one or more users within a current temporal filter; historical user activity data pertaining to interactions of a specific user (or group of users) with specific components, applications/services, users, etc., of the educational platform; historical user activity data identifying how a peer of a user (e.g., classmates) interact with specific components, applications/services, users, etc., of the educational platform; and historical user activity data identifying how a teacher (e.g., of the student/classmates) interact with specific components, applications/services, users, etc., of the educational platform, among other examples.

Furthermore, generation (processing operation 206) of the trained AI model comprises building a proprietary attention model that is tailored to work with contextual data of an educational software platform. Processing for generating a propriety attention model has been described in the foregoing description including the description of system diagram 100 (FIG. 1A). As previously described, an exemplary trained AI model may be adapted to generate a domain-specific attention model to evaluate user activity data associated with users of a specific domain. In the example where a domain is education, a student-centric (personalized) self-attention model is generated that is adapted to consider patterns of activity of a student of interest relative to patterns of activity of other users (e.g., classmates and/or teachers/professors) when making a prediction on said student of interest. A deep learning model of the present disclosure focuses on evaluation of user activity rather than performance outcomes and is therefore able to provide interpretable outcomes that prescribe actionable suggestions to users (e.g., educators, parents).

As an example, contextual analysis to build an attention model focuses on generating mobility determinations derived from analysis of: user activity (individually and comparative with other users) including interactions of students; activity of a student relative to other students; and activity of a student responsive to interactions by/with a teacher (or teachers), among other examples. Through iterative training, a trained AI model is configured to weight these interactions to determine most relevant patterns.

Furthermore, training of an AI model further comprises deriving and/or applying business logic rules that relevant to a specific domain (e.g., education). In an educational example, application of business logic rules help tailor an attention model to identify students in similar circumstances as a baseline for evaluating user behavior in a relative manner. Exemplary business logic rules are configured for an education domain of the educational software platform and used to evaluate a relevance of the mobility determinations generated by a trained AI model. In some examples, specific business logic rules may further be directed to contextual scenarios that are specific to a school/university, school district, school, class/course, etc. In this way, a trained AI Model can identify students in similar circumstances as a baseline for evaluating user behavior.

Exemplary business logic rules may comprise rules that are specific to business decisions and rules that are data driven. Examples of business logic rules that are specific to business decisions comprise but are not limited to rules that identify: what types of data to analyze (e.g., user actions pertaining to assignments); duration of analysis (e.g., for a given data type such as student assignment); how to handle data over given time periods (e.g., relative to a school calendar); rules that are specific to evaluation of users across a specific school/university, school district, school, class/course, etc.; attributes of user activity data to prioritize or to avoid (to mitigate bias); and how to execute comparison of users (e.g., student versus classmates), among other examples. Business logic rules that are specific to business decisions are preset by developers and applicable regardless of the correlations generated as a result of data analysis. As previously identified, business logic rules further comprise application of rules that are data driven generated as a result of training and analysis of domain-specific data. For instance, analysis of user activity data in training may identify data correlations that are most impactful to generating mobility determinations and/or predictive insights. Examples of business logic rules that are data driven comprise but are not limited to rules that identify: define mobility (e.g., how to evaluate quantiles/quartiles during data analysis); placing a weighting (e.g., prioritizing or de-prioritizing) certain data correlations when generating mobility determinations and/or predictive data insights; thresholds for identifying data indicating a trend/pattern versus an outlier (e.g., need X number of instances in data analysis to generate a predictive insight using the data); setting discrimination thresholds (e.g., per user group); identifying when to correlate data of certain users (e.g., teachers, classmates, parents) with a specific student; what data correlations to identify as talking points (e.g., based on relevance analysis of data correlations to a mobility determination); and how to use data to generate predictive insights and GUI notifications (e.g., what data is most relevant to be included in a first-level representation of a data insights and what to include as nested data (e.g., a second-level representation)), among other examples.

Training processing utilizes applied and/or derived business logic rules to curate and prune correlations from raw user activity data. This may comprise analysis as to how data is distributed and feed different thresholds into the business layer to determine importance of mobility determinations. As indicated, data thresholds may be set by developers based using business logic rules, where threshold can be used to identify trends/patterns in data as well as filter out signals that are too sparse. In one example, confidence scoring (relevance scoring) is generated and applied to help derive data correlations that are most important to establish mobility determinations. Furthermore, once mobility determinations are identified, confidence scoring (relevance scoring) may be applied to help curate mobility predictions. For instance, not all mobility predictions are created equal. Confidence scoring (relevance scoring) is applied, relative to business logic rules, to determine which mobility determinations are most relevant to a specific aspect of user behavior that is being analyzed (e.g., an evaluation of user interactions pertaining to an assignment). In one example, a threshold pertaining to relevance scoring is set to identify mobility determinations (that satisfy the threshold) for output during real-time analysis. This can help identify most impact mobility determinations and improve processing efficiency when generating predictive data insights as well as identify talking points as the key data correlations that resulted in generated mobility determinations.

Train of AI processing may further comprise generating an AI model that is tuned to reflect specific metrics for accuracy, precision and/or recall before a trained AI model is exposed for real-time (near real-time) usage. Developers may set thresholds for specific metrics to make sure that a trained AI model is operating as expected. Thresholds for metric evaluation of a specific trained AI model may vary, depending on developer specifications, without departing from the spirit of the present disclosure.

Once a threshold (or thresholds) is met for exposing a trained AI model, flow of method 200 proceeds to processing operation 208. At processing operation 208, the trained AI modeling is exposed for real-time (or near real-time) evaluation of user activity data.

At processing operation 210, trained AI modeling (e.g., a trained AI model) is then applied to generate predictive insights from contextual relevance analysis of the user activity data. In doing so, a current temporal filter (e.g., user activity data over the last week) is set and used to frame analysis of the user activity data of one or more users relative to current user activity data of other users and/or historical user activity data of the user and other users. A current temporal filter is a time period (parameter) used to evaluate recent user activity data. For instance, a current temporal filter may be applied to evaluate one or more users over a recent period of time (e.g., a day, week, month). It is to be recognized that developers can set a current temporal filter to any specific time period without departing from the spirit of the present disclosure.

As indicated in the foregoing description, a trained AI model is adapted to execute a plurality of processing operations to generate predictive insights. For instance, the trained AI modeling generates (processing operation 212) a plurality of mobility determinations that identify changes in patterns of user behavior over a current temporal filter associated with the user activity data. A trained AI model relies on the training of an associated classifier (or classifiers) to analyze generated representations of data and derive mobility determinations therefrom. Mobility determinations are identified changes that indicate the beginning of a trend/pattern for which predictive data insights can then be generated and presented as early warning indications pertaining to user activity. The idea is that early warning indications, as well as contextual understanding of the same, enable users to change their behavior to affect a predicted outcome before it is too late to do so. Mobility determinations provide a deeper level of understanding of user interaction that are reflective of how deeply a student is currently engaging with content of an organization (e.g., a class) within a recent period of time relative to user interactions by other users (e.g., classmates and/or teachers).

In correlation with applied business logic rules, mobility determinations are aimed at identifying changes in quantiles (quartiles) of user activity that are substantial and potentially indicative of a trend in a negative (or positive) direction. Notably, as a group of students is being evaluated collectively (e.g., user activity of a student relative to its other classmates both current and past), subtle changes in user interactions/behaviors over a short period of time, that are not indicative of a trend/pattern, can be ignored. In some instances, those user interactions and behaviors can still become a trend/pattern, for example, when a subsequent round of evaluation commences. Applied business logic rules identify thresholds for evaluating changes in student behavior/interactions relative to current and past performance of a class collectively. For example, a business logic rule is used to set threshold that defines how large a change (deviation) in user activity is required to even register as a mobility determination. For instance, a threshold can be set that says a user has to drop (or increase) from a quantile/ quartile pertaining to an evaluation (e.g., assignment activity/interactions) to even register as a mobility determination. In alternative examples, business logic rules can set thresholds to any value (e.g., a certain percentage) to trigger identification of a mobility determinations. In further examples, the same type of thresholds can be used to curate mobility determinations. One system example of the present disclosure is configured to generate a plurality of mobility of determinations (without considering a threshold), where a threshold evaluation is then applied to curate the mobility determinations to identify those that are most relevant (e.g., most substantial relative to the threshold set by developers).

As indicated in the foregoing, generation (processing operation 212) of mobility determinations evaluates current user activity of a user (e.g., activity within a current temporal filter)) comparatively in a number of different ways, including: directly with historical user activity of that user; and relative to user activity (current and/or historic) of other users (e.g., classmates, teachers). While a relative evaluation between classmates provides an effective baseline to evaluate student behavior, it is also to be recognized that student behavior can change relative to activity of a teacher/professor. As such, the present disclosure applies trained AI processing that correlates user activity data across multiple relative considerations to automatically generate accurate and precise predictive insights. As such the plurality of mobility determinations are generated (processing operation 212) based on a collective relevance analysis that correlates: data pertaining to current user interactions of a first user that are identified within the current temporal filter; data pertaining to historical user interactions of the first user that are identified within a historical temporal filter associated with the user activity data; data pertaining to current user interactions of one or more other users that are identified within the current temporal filter; and data pertaining to historical user interactions of the one or more other users that are identified within the historical temporal filter.

Similar to a current temporal filter, a historical temporal filter is a time period (parameter) used to evaluate historical user activity data. For instance, a historical temporal filter is framed relative to a current temporal filter, where the historical temporal filter is any previous user activity that occurred prior to the time period set for the current temporal filter. In some examples, a specific window of historical user activity data (e.g., last week, last six months, last year) is evaluated relative to a current temporal filter. In other examples, an entirety of historical user activity data for one or more users is evaluated when generating mobility determinations. In at least one example, business logic rules are applied to determine a relevant temporal period for one or more filters such as a historical temporal filter. For instance, an amount of user activity may be a threshold that is evaluated to help frame a historical temporal filter. If an amount of user activity is not satisfied, then certain historical user activity may not need to be considered to generate a relevant mobility determination.

Further processing operations executed by the trained AI modeling comprises curating (processing operation 214) the plurality of mobility determinations to generate a curated listing of mobility determinations. The curated listing of the mobility determinations comprises one or more curated mobility determinations identified based on a threshold evaluation of the relevance scoring for each of the plurality of mobility determinations. As previously indicated, a curated listing of mobility determinations is derived based on an application of business logic rules, configured for an education domain of the educational software platform. Said business logic rules are used to evaluate a relevance of the mobility determinations. In at least one example, an application of the business logic rules comprises applying business logic rules that assign a weighting to specific types of user activity identified within the user activity data. For instance, the specific types of user activity data are instance of user interactions relative to the education-specific (educational domain), which may be identified as most relevant for correlating data based on results of training of an AI classifier. In one example, relevance scoring is generated for each of the plurality of mobility determinations relative to the weighting assigned to specific data correlations. When it comes time to provide rationale supporting predictive insights (e.g., talking points), the weighted data correlations can be identified as talking points to provide a user with a rationale as to why a predictive insight was generated (and selected for presentation).

In further examples, relevance analysis for generating a curated listing of mobility determinations comprises application of business logic rules pertaining to thresholds in activity changes. This may occur in addition to (or in lieu) of relevance analysis that generates relevance scoring based on weighting of data correlations. As previously identified, mobility determinations are aimed at identifying changes in quantiles (quartiles) of user activity that are substantial and potentially indicative of a trend in a negative (or positive) direction. A business logic rule is used to set a threshold that defines how large a change (deviation) in user activity is required to be included in a curated listing of mobility determinations. For example, a threshold can be set that says a user has to drop (or increase) from a quantile/quartile pertaining to an evaluation (e.g., assignment activity/interactions) to make the curated listing of mobility determinations. In alternative examples, business logic rules can set thresholds to any value (e.g., a certain percentage) to be added to a curated listing of mobility determinations. In at least one example, the curated listing of mobility determines is prioritized (ordered) based on results of this relevance analysis. A prioritized (or ordered) listing of mobility determinations may be utilized to determine how many mobility determinations to include for predictive data insight generation.

Flow of method 200 then proceeds to processing operation 216. At processing operation 216, one or more predictive insights may be generated based on an analysis of the curated listing of the plurality of mobility determinations. As previously referenced, predictive insights may be generated based on evaluation of the prioritized (or ordered) listing of mobility determinations derived based on a relevance analysis. For instance, N number of predictive insights (e.g., highest priority/order) may be generated from a curated listing of mobility determinations. In further examples, predictive data insights may be generated for each of the mobility determinations on the curated listing of mobility determinations.

In additional examples, predictive insights may be generated based on multiple aggregation of multiple mobility determinations. For instance, say a predictive insight is generated that says a student may miss a deadline for an assignment based on a recent evaluation of user activity via the collective analysis described in the present disclosure. This may be derived based on analysis of user activity of not only the user relative to past activity of that user on similar assignments (e.g., a first mobility determination) but also based on analysis of group activity between the user and his classmates on similar assignments (e.g., a second mobility determination). In that example, there are two data correlations that provide rationale for a predictive data insight. As such, there may be a higher likelihood of confidence in a predictive insight based on the number of relevant mobility determinations that provide the rationale/basis supporting the predictive insight. Following that example, generation of the predictive insights comprises: assigning, by application of the trained AI model, a confidence scoring to the predictive insights based on a correlation, for each of the one or more predictive insights, with one or more mobility determinations included in the curated listing of the plurality of mobility determinations. In such technical instances, the one or more predictive insights are then generated based on a threshold evaluation of the confidence scoring for each of the one or more predictive insights. Thresholds for evaluating confidence scoring for generation of predictive insights may vary according to developer specifications without departing from the spirit of the present disclosure.

In additional examples, generation of the one or more predictive insights comprises: identifying, from the collective relevance analysis executed by the trained AI model, one or more data correlations that provide rationale supporting predictive insights (e.g., talking points). Talking points as described herein are support/rationale for a predictive insight that provide insight into why a predictive insight was generated. Talking points are intended to help a user (e.g., educator or parent) frame and discuss a trend/pattern of user activity. For example, if a user interaction and proactivity is much lower than it has traditionally been, it may be helpful to use talking points to identify the reason behind this trend. As described in previous examples, contextual analysis of user activity data may yield a determination that a student is not signing in with their normal computing device and instead using a shared computing device of a household, which may be contributing to a lack of user activity. Weighted data correlations can be identified as talking points to provide a user with a rationale as to why a predictive insight was generated (and selected for presentation). As indicated in the foregoing, talking points are includable in predictive data insights and GUI notifications thereof. In one example, a GUI notification of a predictive insight may provide a first-level representation of a predictive data insight, where additional layers of the GUI notification may reveal additional context regarding a predictive insight (e.g., talking points). A non-limiting example of rendering of talking points, in a layered representation is shown in the progression from FIGS. 3A-3C. Talking points may be stored for recall either within a generated predictive insight or as an additional data object (or metadata) that can be added to a GUI notification of a predictive insight.

Once predictive insights (and associated data objects) are generated, flow of method 200 proceeds to processing operation 218. At processing operation 218, data pertaining to notification(s) of predictive insights is managed. For instance, processing operation 218 may comprise generating a GUI notification that comprises the one or more predictive insights. This may occur through automated processing by trained AI modeling or via an application/service associated with the educational software platform. In one example, formatting of notifications is predetermined to populate data fields based on the type of notification (e.g., callout, GUI menu, graph, dynamic timeline) being generated. In other examples, a format and layout of a notification may be dynamically generated based on analysis of the type of mobility determinations and predictive insights generated. For example, key data points of correlated data may be expressible in various ways, which may be best represented by evaluating the type of correlated data points to represent relative to processing capabilities of applications/services of the educational software platform. In some technical instances, user interactions with GUI notifications of predictive data insights may dictate how and when to present data associated with a predictive data insight. For example, a user action may select a GUI feature of a surfaced GUI notification to reveal additional context (e.g., talking points) regarding predictive data insights. In further examples, GUI notifications are configured to enable users to take immediate action to address findings of a predictive insight. GUI notifications may comprise links to automatically initiate message notifications, email notifications, and links to additional telemetric data (e.g., graphs, charts, statistics), among other examples.

In some examples, predictive insights and GUI notifications are dynamically generated during real-time (or near real-time) user operation of an educational software platform. In other examples, predictive insights and GUI notifications thereof are stored for recall and presented to a user during subsequent access to the educational software platform. For instance, processing operation 218 may comprise storing, on a distributed data storage that is associated with the educational software platform, the predictive insights and associated GUI notifications. As previously referenced, a data storage of a file hosting service or a document management storage system is used to store and manage data for a trained AI model, generated mobility determinations, generated predictive insights (and associated data objects) and generated GUI notifications comprising predictive insights.

Whether or not predictive insights are generated and presented in real-time (or near real-time), data for rendering the one or more predictive insights is transmitted (processing operation 220) to an application or service of the educational software platform. In instances where a GUI notification has already been generated, the data for rendering the one or more predictive insights is data for rendering the GUI notification comprising the one or more predictive insights.

Figure 3B:
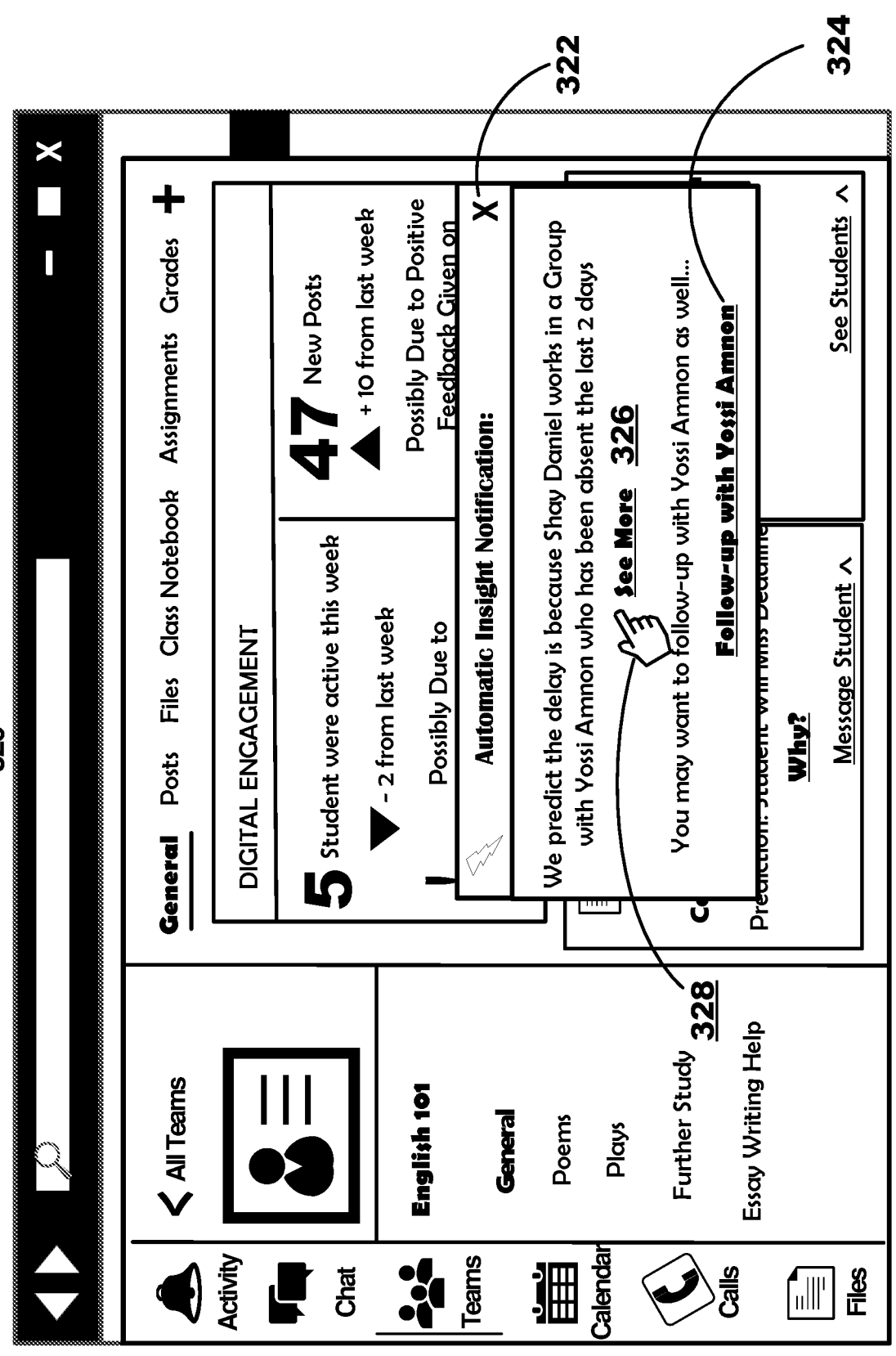
Figure 3C:
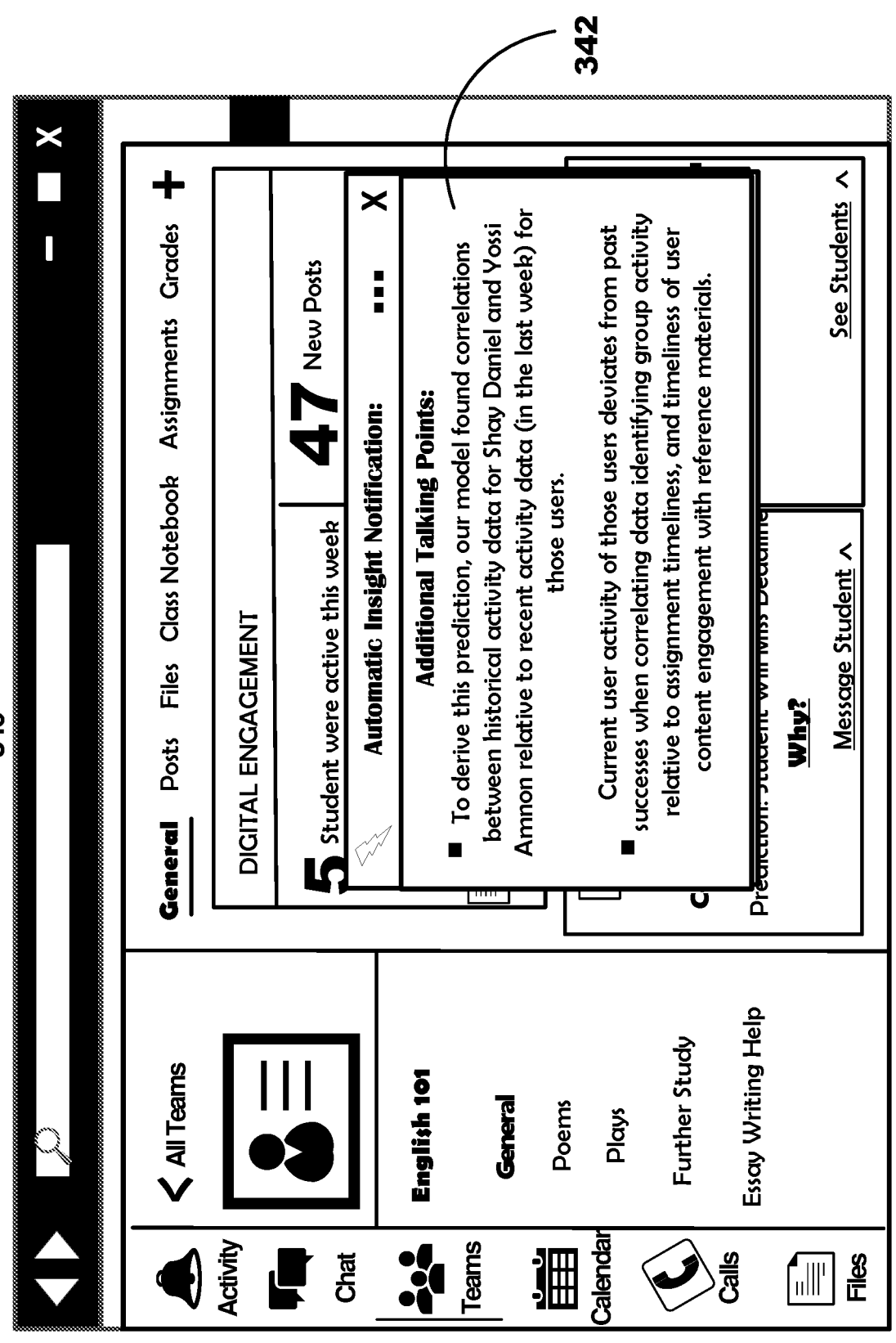
Figure 4:
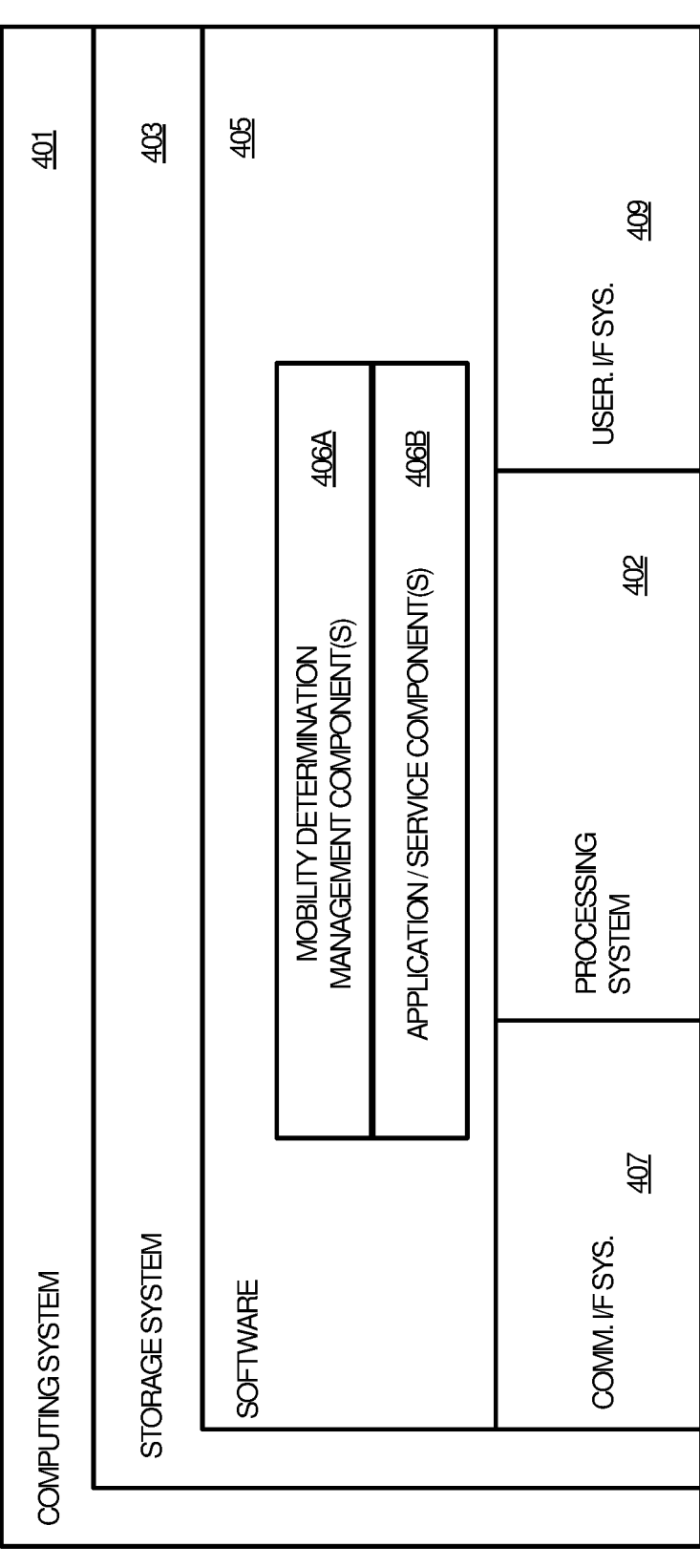
FIG. 4 illustrates a computing system suitable for implementing processing operations described herein related to generation and management of mobility determinations and derivation of predictive data insights therefrom, with which aspects of the present disclosure may be practiced.

In some examples, rendering of a GUI notification may be processing executed by an exemplary computing device (e.g., computing system 401 of FIG. 4). Flow of method 200 may then proceed to processing operation 222. At processing operation 22, the one or more predictive insights are rendered in the GUI notification that is displayable through a GUI of the application or service of the educational software platform. Inline, as referenced in the present disclosure, is intended to refer to technical instances where data is embedded as a content portion (data object), among other content portions, that is displayable within a rendering of a host application/service. For instance, a GUI notification and associated data are embedded components that appears as content portions within a GUI of a host application/service endpoint. An application or service of the educational software platform uses the data for rendering the GUI notification to present a predictive insight. Non-limiting examples of GUI notifications are provided in the processing device views illustrated in FIGS. 3A-3C.

Furthermore, in examples where a GUI notification is rendered in GUI of an application/service, flow of method 200 may proceed to processing operation 224. At processing 224, presentation of the GUI notification is updated based on user interaction (user action) with the GUI notification. For instance, a user may select a GUI element requesting additional contextual information about a predictive insight. In other instances, a user (e.g., teacher, administrator, parent, student) may wish to follow-up with another user with respect to a prediction. In further instances, users may provide user feedback regarding the accuracy and relevance of a predictive insight and/or GUI notification.

User feedback may be used to continuously update a trained AI model to improve predictions and generate the most contextually relevant insights. As such, any user activity, including user feedback received with respect to GUI notifications and/or predictive insights may be used to update (processing operation 226) the AI modeling. For instance, training data and/or a corpus of additional user activity data may be added and further used to build off of previous iterations of the trained AI modeling. Method 200 may then return to processing operation 202 to collect additional user activity data for subsequent analysis thereof. As previously indicated, predictive insights may be continuously generated (e.g., using a new current temporal filter) to frame user activity as a student progresses throughout a class/course. Subsequent predictive insights may be relative to the same assignment in which previous predictive insights were generated as well as new assignments (or evaluation of other aspects of user activity).

FIGS. 3A-3C illustrate exemplary processing device views associated with user interface examples for an improved user interface that is adapted for generation and management of predictive data insights from management of mobility determinations, with which aspects of the present disclosure may be practiced. FIGS. 3A-3C provide non-limiting front-end examples of processing described in the foregoing including system diagram 100, process flow 120 (FIG. 1B), process flow 150 (FIG. 1C), and method 200 (FIG. 2).

FIG. 3A presents processing device view 300, illustrating a GUI of a collaborative communication application/service (e.g., MICROSOFT® TEAMS®) that is configured as part of an educational software platform. Processing device view 300 illustrates the presentation of a plurality of exemplary GUI notifications inline with other content of the collaborative communication application/service. Inline, as referenced in the present disclosure, is intended to refer to technical instances where data is embedded as a content portion (data object), among other content portions, that is displayable within a rendering of a host application/service. Processing operations for generation of exemplary notifications that comprise predictive insights have been described in the foregoing description.

In the example shown in processing device view 300, a digital engagement GUI menu 302 presents multiple GUI notifications (respectively first GUI notification 304 and second GUI notification 306) pertaining to evaluation of user engagement with digital content that is associated with an educational software platform. GUI notifications 304 and 306 comprise forms of both descriptive data insights and predictive data insights. From contextual analysis of user activity data (e.g., by the trained AI modeling) a predictive insight 312 is generated providing a predictive talking point (rationale) as to why student activity decreased over the last week. For example, predictive insight 312 identifies a rationale for the reduced amount of student activity that is derived from analysis of mobility determinations and key points of correlated data that support the mobility determinations. As can be seen in processing device view 300, predictive insight 312 suggests that home device sharing issues (e.g., amongst students) may be the result for less student activity through the educational software platform. For instance, it may be determined correlation of user activity data may prove that a user is not logging in from its assigned laptop and is instead logging in from a tablet that is shared with multiple other users. This provides an understandable explanation for a teacher to follow-up on and help remedy the situation.

In the example shown in GUI notification 306, a predictive insight 314 is generated to aid descriptive insights identifying analytics of user content postings relative to an educational software platform. As can be seen in processing device view 300, predictive insight 314 suggests that teacher feedback provided to students for a last posting was the underlying trigger for increased user posting activity. This predictive insight was likely derived from the correlation processing of user activity data for students of a class relative to user activity data by the teacher of the class. This provides an understandable rationale for a teacher to understand a direct correlation between its activity in the educational software platform and an effect on its students.

GUI notification 308 provides another example of a predictive insight. Similar to the previously described GUI notifications, GUI notification 308 comprises both descriptive insights and predictive insights. In the example shown, a descriptive insight ("Shay Daniel hasn't started Comedy of Errors assignment yet") is provided. Based on a comparative analysis of user activity data for a current temporal period (e.g., current week) of a specific user relative to other users (e.g., classmates) and further relative to historical activity data of the user and other users of a class, predictive insight 316 is generated providing a predicted outcome that anticipates that a student will miss the assignment deadline. Again, this level of prediction is considered an early warning indication because the assignment due date has not passed and there is still time for the user to change its behavior. This predictive outcome is useful for a teacher, parent, school administrator, etc., because it gives them a chance to follow-up with the student to potentially resolve an issue that is preventing the student from completing the assignment.

Continuing the example shown in GUI notification 308, a user (e.g., teacher) executes a user action 318 selecting a GUI feature associated with the predictive insight 316 (predictive outcome). The GUI feature is question ("WHY") prompting the user to select the GUI feature to obtain additional information. User action 318 is a trigger for display of processing device view 320 (FIG. 3B) subsequently described.

GUI notification 310 provides another example of a predictive outcome as a predicted insight. In the example shown in GUI notification 310, a prediction is made that a plurality of students are predicted to have reduced participation during a future lesson segment ("Creative Writing") which is scheduled to being the following week. This predictive analysis may have been derived from analysis of mobility determinations that compares students relative to one another with respect to interactions with a specific topic of a class.

FIG. 3B presents processing device view 320, illustrating a continued example of processing from that shown in processing device view 300 (FIG. 3A). As previously referenced, processing device view 320 is presented as a result of receipt of user action 318 selecting a GUI feature to obtain additional contextual information about a predictive insight 316 as shown in FIG. 3A. In response to receipt of user action 318, an automatic insight notification 322 is automatically presented for the user. Automatic insight notification 322 provides additional talking points relative to the presentation of predictive insight 316. For instance, contextual relevance processing of the present disclosure yielded a determination that predicted insight 316 is based on correlated data that identifies that a user's group partner has been absent the last two days. From correlating user activity data across multiple users, it can be derived that another user's absence is affecting the performance of a specific student. As a corollary, the predictive outcome and additional talking points lead to a follow-up notification 324 being presented that suggests that a teacher follow-up to check on the absent student ("Yossi Amnon"). This correlation is yet another way in which predictive insights can be used as early warning indications which a teacher can follow-up on before a larger issue presents itself.

Additionally, the automatic insight notification 322, presented in processing device view 320, further comprises a GUI element 326 that enables a user (e.g., teacher) to dive deeper into this predictive insight. For instance, GUI element 326 is presented as a suggestive link (selectable link represented as ("See More"), which is selectable to dive deeper into the contextual information. Processing device view 320 shows a user action 328 selecting the GUI element 326. User action 328 is a trigger for display of processing device view 340 (FIG. 3C) subsequently described.

FIG. 3C presents processing device view 340, illustrating a continued example of processing from that shown in processing device view 320 (FIG. 3B). As previously referenced, processing device view 340 is presented based on receipt of user action 328 selecting a GUI feature 326 to obtain additional contextual information about a predictive insight 316 as shown in FIG. 3A. In response to receipt of user action 328, an additional deep level of analysis is provided for the predictive insight 316, where automatic insight notification 342 is automatically presented for the user. Automatic insight notification 342 presents additional talking points that provide rationale diving deeper into how a predictive insight 316 (e.g., predictive outcome) is determined. In the example shown, specific data correlations are provided to a user (e.g., teacher) as well as specific types of user activity data that was determined to be relevant to that prediction (e.g., group activity, assignment timeliness from content submissions, user timeliness with respect to content engagement including reference materials for previous assignments). This correlation is yet another way in which predictive insights can be used as early warning indications, and also providing numerous talking points for a teacher to understand a context surrounding a prediction as well as follow-up with students to avoid a negative result.

FIG. 4 illustrates a computing system suitable for implementing processing operations described herein related to generation and management of mobility determinations and derivation of predictive data insights therefrom, with which aspects of the present disclosure may be practiced. As referenced above, computing system 401 may be configured to implement processing operations of any component described herein including exemplary components previously described in system diagram 100 (FIG. 1). As such, computing system 401 may be configured to execute specific processing operations to solve the technical problems described herein, which comprise processing operations for intelligent and timely mobility determinations identifying changes that indicate the beginning of a trend/pattern for which predictive data insights can then be generated and presented as early warning indications pertaining to user activity. The idea is that early warning indications, as well as contextual understanding of the same, enable users to change their behavior to affect a predicted outcome before it is too late to do so. Computing system 401 may be implemented as a single apparatus, system, or device or may be implemented in a distributed manner as multiple apparatuses, systems, or devices. For example, computing system

401 may comprise one or more computing devices that execute processing for applications and/or services over a distributed network to enable execution of processing operations described herein over one or more applications or services. Computing system 401 may comprise a collection of devices executing processing for front-end applications/services, back-end applications/service or a combination thereof. Computing system 401 comprises, but is not limited to, a processing system 402, a storage system 403, software 405, communication interface system 407, and user interface system 409. Processing system 402 is operatively coupled with storage system 403, communication interface system 407, and user interface system 409. Non-limiting examples of computer system 401 comprise but are not limited to: smart phones, laptops, tablets, PDAs, desktop computers, servers, smart computing devices including television devices and wearable computing devices including VR devices and AR devices, e-reader devices, gaming consoles and conferencing systems, among other non-limiting examples.

Processing system 402 loads and executes software 405 from storage system 403. Software 405 includes one or more software components (e.g., 406A-B) that are configured to enable functionality described herein. In some examples, computing system 401 may be connected to other computing devices (e.g., display device, audio devices, servers, mobile/remote devices, gaming devices, VR devices, AR devices, etc.) to further enable processing operations to be executed. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute system diagram 100 (FIG. 1A), process flow 120 (FIG. 1B), process flow 150 (FIG. 1C), processing operations described in method 200 (FIG. 2) and/or the accompanying description of FIGS. 3A-3C.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, microprocessors, graphical processing units, application specific processors, sound cards, speakers and logic devices, gaming devices, VR devices, AR devices as well as any other type of processing devices, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for executing a mobility determination management component 406a; and application/service components 406b, as described herein. In further examples, software may comprise program instructions for executing a separate component for implementation of a programmed software module and/or trained AI processing though in other instances a programmed software module and/or trained AI processing may be executed by one of the other components of system diagram 100 in combination with one or more computing systems 401.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to execute specific processing components described herein as well as process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein including rendering of: management of trained AI processing including generation and update of trained machine learning modeling; management of log data, user activity data and telemetry data; an improved GUI providing predictive data insights pertaining to mobility determinations that are used as early warning indications; generation and management of contextual data insights related to predictive data insights derived from mobility determinations; enabling user interactions with GUI elements and features including presentation of GUI menus and callouts, application command control, etc. and providing notifications through different host application/service endpoints (e.g., via GUI elements, OS notifications and/or inline with content), among other examples. User interface system 409 comprises a graphical user interface that presents graphical user interface elements representative of any point in the processing described in the foregoing description including processing operations described in system diagram 100 (FIG. 1A), process flow 120 (FIG. 1B), process flow 150 (FIG. 1C), processing operations described in method 200 (FIG. 2) and/or the accompanying description of FIGS. 3A-3C.

A graphical user interface of user interface system 409 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 401 that enable output of other types of signals (e.g., audio output, handwritten input, AR/VR input) in conjunction with operation of exemplary applications/services described herein.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), Web Socket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Some non-limiting examples of the present disclosure describe systems and/or method for managing automated notifications of content update through the generation and presentation of GUI notifications of predictive insights. For instance, a computer-implemented method may be executed across at least one computing device, including a system and/or computer-readable storage media, to accomplish processing described herein.

A computer-implemented method is implemented that automatically generates predictive insights from analysis of user activity data associated with an educational software platform. In doing so, the computer-implemented method executes a plurality of processing operations subsequently described. As a first processing operation, user activity data is accessed. Exemplary user activity data pertains data indicating user interactions by a plurality of users with the educational software platform. The user activity data is raw signal data received from a plurality of applications or services associated with the educational software platform.

Continuing the above example, a trained AI model is automatically applied. The trained AI model is adapted to generate predictive insights from contextual relevance analysis of the user activity data. The trained AI model executes numerous processing operations. For instance, the trained AI model generates a plurality of mobility determinations that identify changes in patterns of user behavior over a current temporal filter associated with the user activity data. The plurality of mobility determinations are generated based on a collective relevance analysis that correlates: data pertaining to current user interactions of a first user that are identified within the current temporal filter; data pertaining to historical user interactions of the first user that are identified within a historical temporal filter associated with the user activity data; data pertaining to current user interactions of one or more other users that are identified within the current temporal filter; and data pertaining to historical user interactions of the one or more other users that are identified within the historical temporal filter. The trained AI model further curates the plurality of mobility determinations to generate a curated listing of mobility determinations derived based on an application of business logic rules. The business logic rules are configured for an education domain of the educational software platform and used to evaluate a relevance of the mobility determinations. The trained AI model is further configured to generate one or more of the predictive insights based on an analysis of the curated listing of the plurality of mobility determinations.

In some examples, the computer-implemented method comprises storing, on a distributed data storage, the one or more predictive insights for recall. An exemplary GUI notification is generated which is representative of data for rendering the one or more predictive insights. Data for rendering the one or more predictive insights is then transmitted to an application or service of the educational software platform. For instance, the transmitting of the data for rendering the one or more predictive insights retrieves the one or more predictive insights from the distributed data storage. The one or more predictive insights are able to be rendered in a GUI notification displayable through the application or service of the educational software platform. For instance, the computer-implemented method comprises rendering, in a GUI of the application or service, the GUI notification comprising the one or more predictive insights.

In further examples, the generating of the one or more predictive insights comprises identifying, from the collective relevance analysis executed by the trained AI model, one or more data correlations between the first user and the one or more other users. Additionally, the generating of the one or more predictive insights further comprises including the one or more data correlations in the one or more predictive insights as rationale providing support for a prediction by the trained AI model. In further technical instances, processing executed in generation of the one or more of the predictive insights comprises: assigning, by application of the trained AI model, a confidence scoring to the predictive insights based on a correlation, for each of the one or more predictive insights, with one or more mobility determinations included in the curated listing of the plurality of mobility determinations. The one or more predictive insights are generated based on a threshold evaluation of the confidence scoring for each of the one or more predictive insights.

In additional examples, an evaluation of the relevance of the mobility determinations occurs based on the application of the business logic rules. The application of the business logic rules, executed in the curating the plurality of mobility determinations, comprises applying business logic rules that assign a weighting to specific types of user activity identified within the user activity data. The specific types of user activity data are instances of user interactions relative to the educational domain. The evaluation of the relevance of the mobility determinations comprises generating relevance scoring for each of the plurality of mobility determinations relative to the weighting assigned. The curated listing of mobility determinations comprises one or more curated mobility determinations identified based on a threshold evaluation of the relevance scoring for each of the plurality of mobility determinations.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method comprising:

accessing user activity data pertaining to user interactions by a plurality of users with an educational software platform;

generating at least one engagement mobility determination that identifies a recent change in user behavior over a recent period of time, wherein the at least one engagement mobility determination is generated based on a relevance analysis of at least:

recent user interaction data associated with a first user during the recent period of time; and historical user interaction data associated with the first user during a historical period of time;

generating at least one predictive insight based on an analysis of the at least one engagement mobility determination; and providing data for rendering the at least one predictive insight in a notification in a graphical user interface.

2. The computer-implemented method of claim 1, further comprising generating at least one additional engagement mobility determination, wherein the at least one additional engagement mobility determination is generated based on a relevance analysis of at least:

recent user interaction data associated with one or more other users during the recent period of time; and historical user interaction data associated with the one or more other users during the historical period of time.

3. The computer-implemented method of claim 1, wherein generating the at least one engagement mobility determination and generating the at least one predictive insight comprises providing the user activity data to one or more machine learning models trained to generate predictive insights from a contextual relevance analysis of the user activity data.

4. The computer-implemented method of claim 3, wherein the one or more machine learning models execute processing operations comprising:

generating a plurality of mobility determinations including the at least one engagement mobility determination;

generating a curated list of the plurality of mobility determinations by applying business logic rules configured for the educational software platform that are used to evaluate a relevance of the plurality of mobility determinations; and generating the at least one predictive insight based on the analysis of the curated list of the plurality of mobility determinations.

5. The computer-implemented method of claim 4, wherein applying the business logic rules comprises assigning weights to specific types of user activity identified in the user activity data, wherein the specific types of user activity are instances of user interactions relative to the educational software platform.

6. The computer-implemented method of claim 1, wherein the user activity data is raw signal data received from a plurality of applications associated with the educational software platform.

7. The computer-implemented method of claim 1, further comprising storing, in a data storage, the at least one predictive insight for recall, wherein providing the data for rendering the at least one predictive insight in the notification in the graphical user interface comprises retrieving the at least one predictive insight from the data storage.

8. A computing apparatus comprising:

one or more computer readable storage media;

one or more processors operatively coupled with the one or more computer readable storage media; and program instructions stored on the one or more computer readable storage media that, when executed by the one or more processors, direct the computing apparatus to:

access user activity data pertaining to user interactions by a plurality of users with an educational software platform;

generate at least one engagement mobility determination that identifies a recent change in user behavior over a recent period of time, wherein the at least one engagement mobility determination is generated based on a relevance analysis of at least:

recent user interaction data associated with a first user during the recent period of time; and historical user interaction data associated with the first user during a historical period of time;

generate at least one predictive insight based on an analysis of the at least one engagement mobility determination; and provide data for rendering the at least one predictive insight in a notification in a graphical user interface.

9. The computing apparatus of claim 8, wherein the program instructions further direct the computing apparatus to generate at least one additional engagement mobility determination, wherein the at least one additional engagement mobility determination is generated based on a relevance analysis of at least:

recent user interaction data associated with one or more other users during the recent period of time; and historical user interaction data associated with the one or more other users during the historical period of time.

10. The computing apparatus of claim 8, wherein to generate the at least one engagement mobility determination and generate the at least one predictive insight, the program instructions direct the computing apparatus to provide the user activity data to one or more machine learning models trained to generate predictive insights from a contextual relevance analysis of the user activity data.

11. The computing apparatus of claim 10, wherein the one or more machine learning models execute processing operations comprising:

generating a plurality of mobility determinations including the at least one engagement mobility determination;

generating a curated list of the plurality of mobility determinations by applying business logic rules configured for the educational software platform that are used to evaluate a relevance of the plurality of mobility determinations; and generating the at least one predictive insight based on the analysis of the curated list of the plurality of mobility determinations.

12. The computing apparatus of claim 11, wherein applying the business logic rules comprises assigning weights to specific types of user activity identified in the user activity data, wherein the specific types of user activity are instances of user interactions relative to the educational software platform.

13. The computing apparatus of claim 8, wherein the user activity data is raw signal data received from a plurality of applications associated with the educational software platform.

14. The computing apparatus of claim 8, wherein the program instructions further direct the computing apparatus to store, in a data storage, the at least one predictive insight for recall, wherein to provide the data for rendering the at least one predictive insight in the notification in the graphical user interface, the program instructions direct the computing apparatus to retrieve the at least one predictive insight from the data storage.

15. One or more computer readable storage media having program instructions stored thereon that, when executed by one or more processors, direct a computing apparatus to at least:

access user activity data pertaining to user interactions by a plurality of users with an educational software platform;

generate at least one engagement mobility determination that identifies a recent change in user behavior over a recent period of time, wherein the at least one engagement mobility determination is generated based on a relevance analysis of at least:

recent user interaction data associated with a first user during the recent period of time; and historical user interaction data associated with the first user during a historical period of time;

generate at least one predictive insight based on an analysis of the at least one engagement mobility determination; and provide data for rendering the at least one predictive insight in a notification in a graphical user interface.

16. The one or more computer readable storage media of claim 15, wherein the program instructions further direct the computing apparatus to generate at least one additional engagement mobility determination, wherein the at least one additional engagement mobility determination is generated based on a relevance analysis of at least:

recent user interaction data associated with one or more other users during the recent period of time; and historical user interaction data associated with the one or more other users during the historical period of time.

17. The one or more computer readable storage media of claim 15, wherein to generate the at least one engagement mobility determination and generate the at least one predictive insight, the program instructions direct the computing apparatus to provide the user activity data to one or more machine learning models trained to generate predictive insights from a contextual relevance analysis of the user activity data.

18. The one or more computer readable storage media of claim 17, wherein the one or more machine learning models execute processing operations comprising:

generating a plurality of mobility determinations including the at least one engagement mobility determination;

generating a curated list of the plurality of mobility determinations by applying business logic rules configured for the educational software platform that are used to evaluate a relevance of the plurality of mobility determinations; and generating the at least one predictive insight based on the analysis of the curated list of the plurality of mobility determinations.

19. The one or more computer readable storage media of claim 18, wherein applying the business logic rules comprises assigning weights to specific types of user activity identified in the user activity data, wherein the specific types of user activity are instances of user interactions relative to the educational software platform.

20. The one or more computer readable storage media of claim 15, wherein the user activity data is raw signal data received from a plurality of applications associated with the educational software platform.

* * * * *